US012476029B2

(12) United States Patent
Fukuchi

(10) Patent No.: US 12,476,029 B2
(45) Date of Patent: Nov. 18, 2025

(54) RESISTOR

(71) Applicant: Proterial, Ltd., Tokyo (JP)

(72) Inventor: Keisuke Fukuchi, Tokyo (JP)

(73) Assignee: Proterial Ltd., Tokyo (JP)

(*) Notice: Subject to any disclaimer, the term of this patent is extended or adjusted under 35 U.S.C. 154(b) by 290 days.

(21) Appl. No.: 18/172,500

(22) Filed: Feb. 22, 2023

(65) Prior Publication Data

US 2023/0268104 A1 Aug. 24, 2023

(30) Foreign Application Priority Data

Feb. 22, 2022 (JP) ................................. 2022-025899

(51) Int. Cl.

*H01C 17/00* (2006.01)
*H01C 1/084* (2006.01)
*H01C 1/146* (2006.01)

(52) U.S. Cl.

CPC ........... *H01C 17/006* (2013.01); *H01C 1/084* (2013.01); *H01C 1/146* (2013.01)

(58) Field of Classification Search

CPC ....... H01C 17/006; H01C 1/084; H01C 1/146
See application file for complete search history.

(56) References Cited

U.S. PATENT DOCUMENTS 3,238,489 A * 3/1966 Hay ......................... H01C 3/20 338/276
3,440,589 A * 4/1969 Minks .................... H01C 1/084 174/521
3,541,489 A * 11/1970 Person ................... H01C 1/084 338/270
4,935,717 A * 6/1990 Osawa ............... H01H 85/0241 338/51
5,041,902 A * 8/1991 McShane .............. H01L 23/367 257/E23.047
7,535,335 B2 * 5/2009 Brioschi ................ H01C 1/084 338/237

FOREIGN PATENT DOCUMENTS

| | | | | |
|---|---|---|---|---|
| CN | 109300638 | * | 2/2019 | ............. H01C 1/032 |
| CN | 214541761 | * | 10/2021 | |
| JP | S6115901 | * | 4/1986 | |
| JP | H05-031202 | U | 4/1993 | |
| JP | H10-065076 | A | 3/1998 | |
| JP | 2006-093528 | A | 4/2006 | |
| JP | 3132750 | * | 6/2007 | |
| JP | 2009-038275 | A | 2/2009 | |
| JP | 2011-222972 | A | 11/2011 | |
| JP | 2014-093427 | A | 5/2014 | |
| JP | 2018-050018 | A | 3/2018 | |

OTHER PUBLICATIONS

JP-S6115901 translation (Year: 1986).*
JP-3132750 translation (Year: 2007).*
CN-109300638 translation (Year: 2019).*
CN-214541761 translation (Year: 2021).*
Notice of Reasons for Refusal dated Aug. 12, 2025 received from the Japanese Patent Office in related JP 2022-025899 together with English language translation.

* cited by examiner

*Primary Examiner* — Kyung S Lee
(74) *Attorney, Agent, or Firm* — Scully, Scott, Murphy & Presser, PC

(57) ABSTRACT

A resistor includes a resistor main body, and a resin portion covering the resistor main body. The resin portion includes a radiation fin.

6 Claims, 19 Drawing Sheets

RESISTOR

CROSS-REFERENCE TO RELATED APPLICATIONS

The present patent application claims the priority of Japanese patent application No. 2022-025899 filed on Feb. 22, 2022, and the entire contents thereof are hereby incorporated by reference.

TECHNICAL FIELD

The present invention relates to a resistor.

BACKGROUND OF THE INVENTION

Patent Literature 1 discloses a cement resistor including a case, a resistor arranged inside the case, and a cement material that is filled in the case and seals the resistor.

Citation List Patent Literature 1: JP2009-38275A

SUMMARY OF THE INVENTION

In the cement resistor described in Patent Literature 1, heat generated in the resistor is transferred to the cement material and the case in this order, then dissipated outside the cement resistor. However, there is a room for improving the cement resistor from the viewpoint of improving the heat dissipation.

The present invention was made in view of the aforementioned circumstances, and it is an object to provide a resistor that can improve the heat dissipation.

So as to achieve the above-mentioned object, one aspect of the present invention provides a resistor, comprising:

a resistor main body; and a resin portion covering the resistor main body, wherein the resin portion comprises a radiation fin.

Advantageous Effects of the Invention

According to the present invention, it is possible to provide a resistor that can improve the heat dissipation.

DETAILED DESCRIPTION OF THE INVENTION

First Embodiment

The first embodiment of the present invention will be explained with referring to FIGS. 1 to 4. In the meantime, the embodiments explained below are shown as preferred specific examples. Various technical preferable technical matters may be specifically indicated. However, the technical scope according to the present invention is not limited to the specific embodiments.

Figure 1:
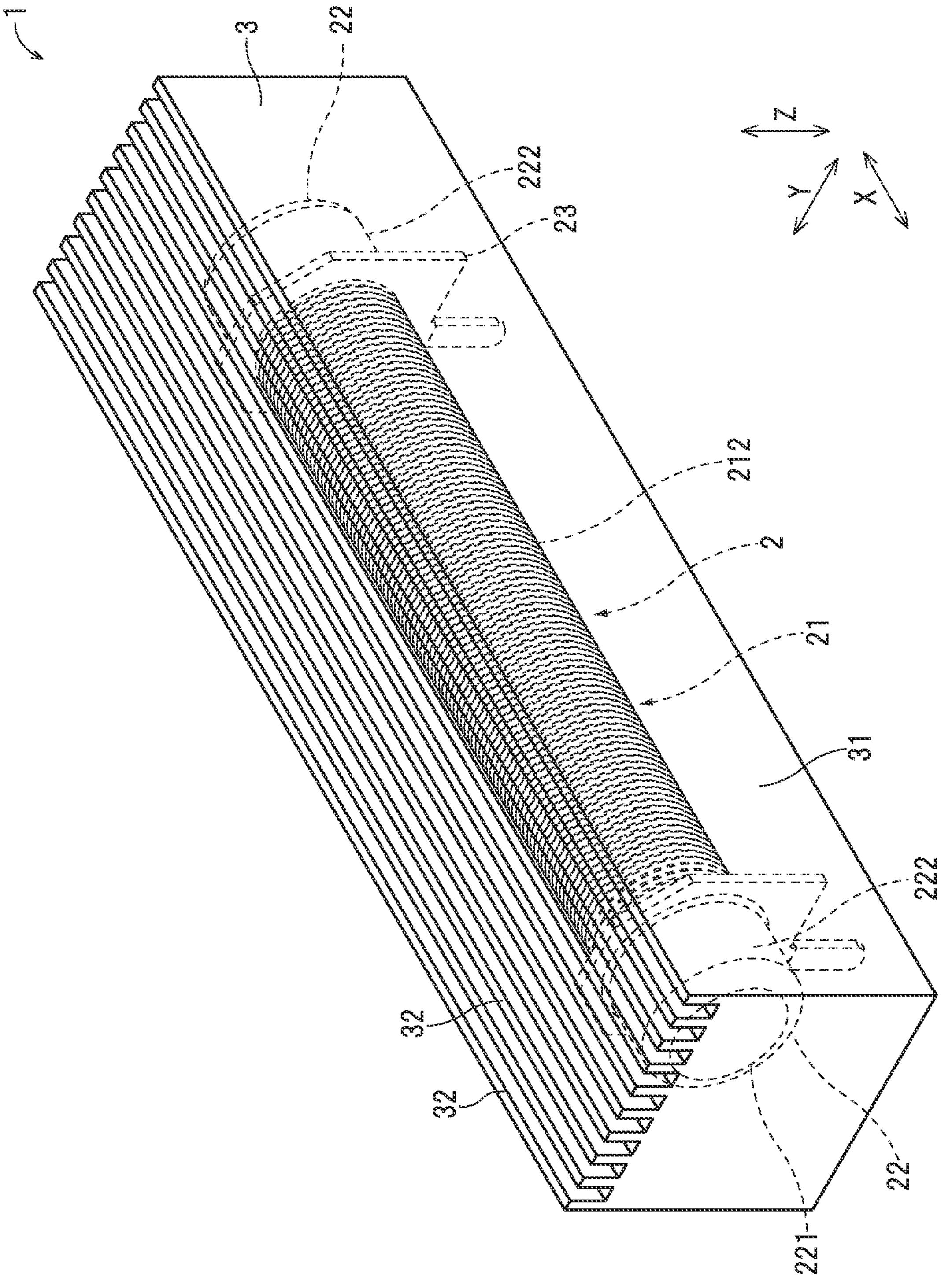
FIG. 1 is a perspective view showing a resistor according to the first embodiment.
Figure 2:
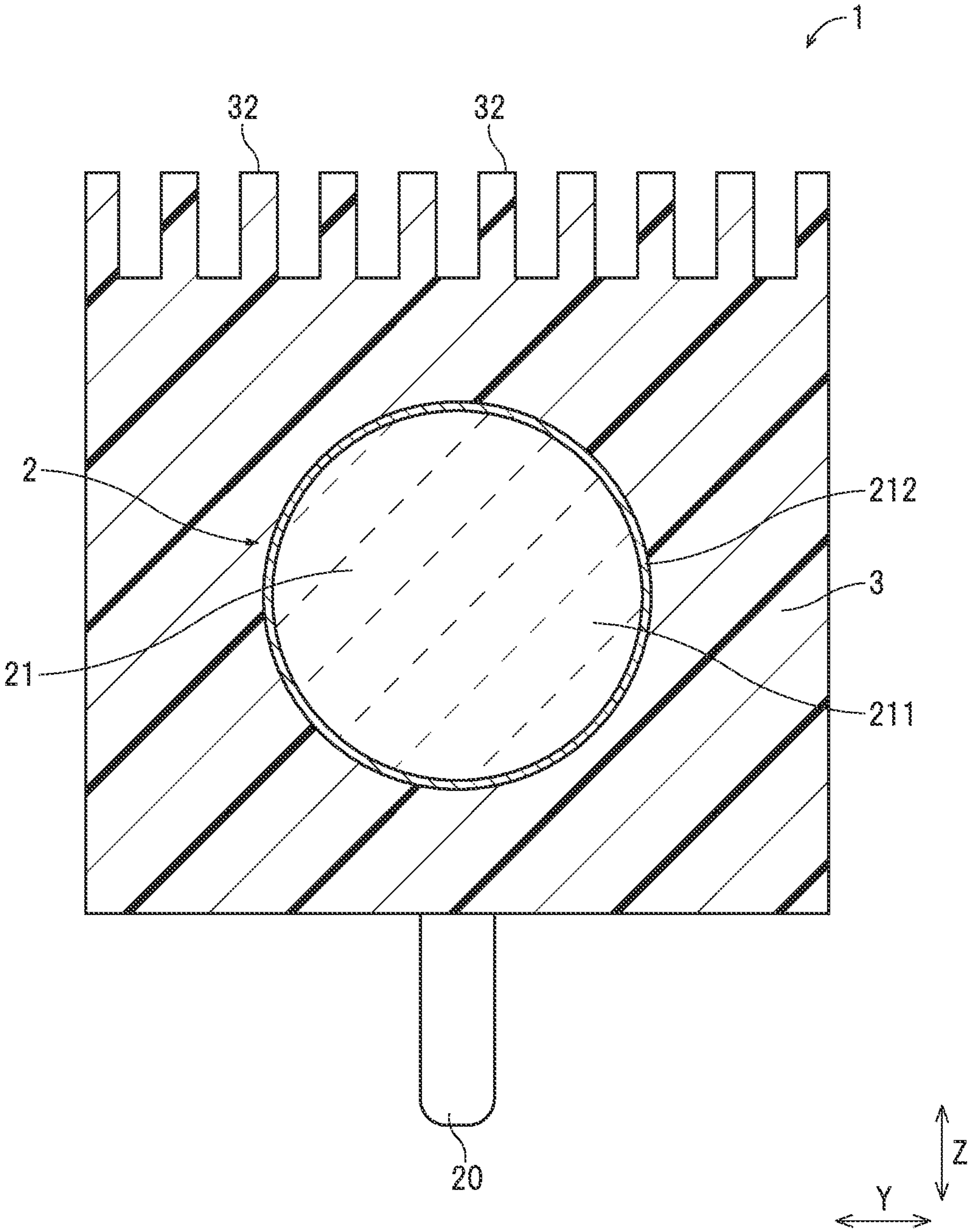
FIG. 2 is a cross-sectional view showing the resistor according to the first embodiment in a direction orthogonal to a longitudinal direction of the resistor.
Figure 3:
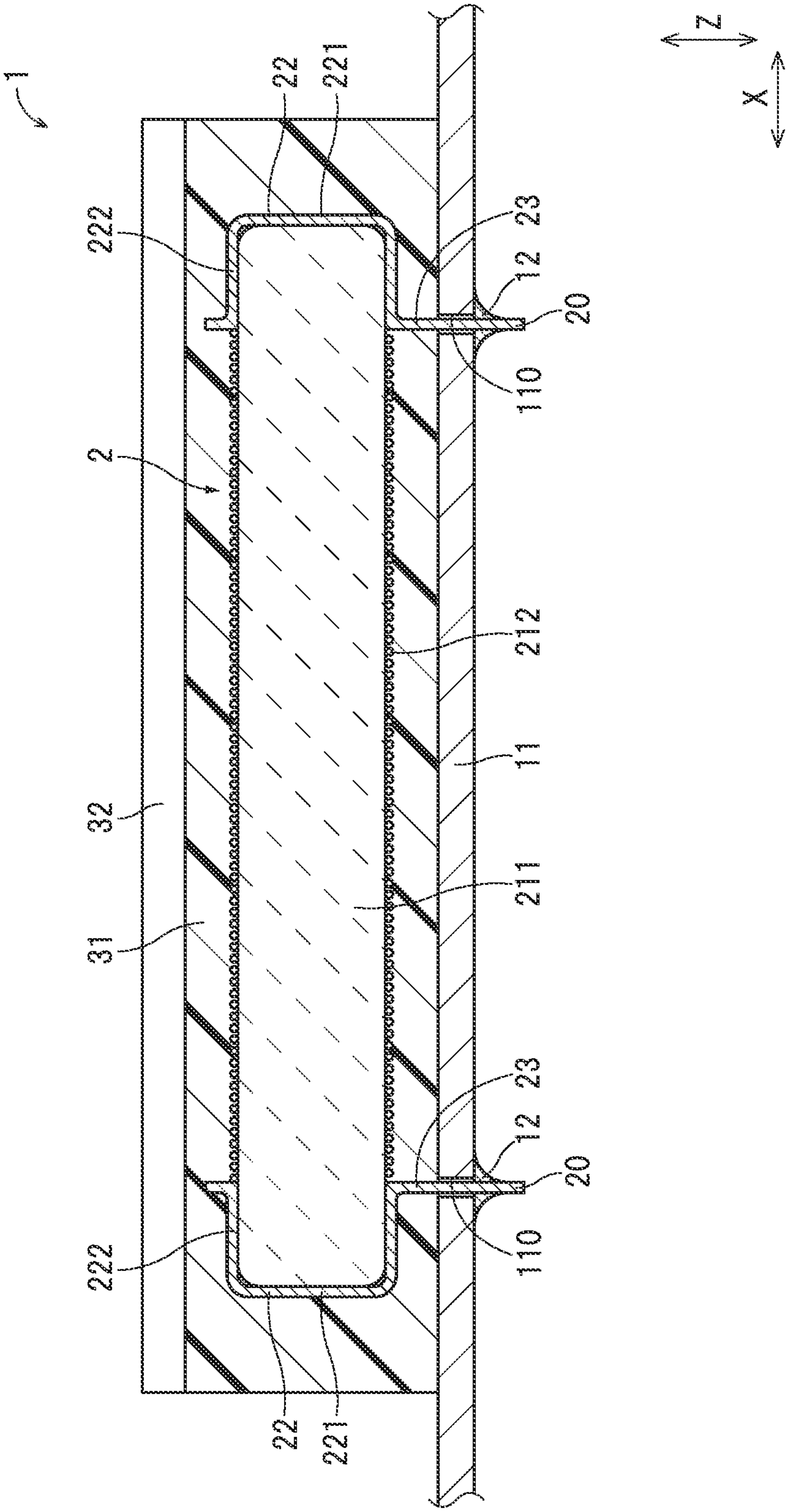
FIG. 3 is a cross-sectional view showing the resistor according to the first embodiment in a direction parallel to the longitudinal direction of the resistor.

FIG. 1 is a perspective view showing a resistor 1 according to the first embodiment. FIG. 2 is a cross-sectional view showing the resistor 1 in a direction orthogonal to the longitudinal direction of the resistor 1. FIG. 3 is a cross-sectional view showing the resistor 1 in a direction parallel to the longitudinal direction of the resistor 1. FIG. 3 shows the state where the resistor 1 is attached to a circuit board 11.

The resistor 1 comprises a resistor main body 2 formed lengthy in one direction, and a resin portion 3 embedding the resistor main body 2. Hereinafter, a longitudinal direction of the resistor main body 2 will be simply referred to as the longitudinal direction X. In addition, a side closer to the center of the resistor main body 2 in the longitudinal direction X will be referred to as "longitudinally inward". A side far from the center of the resistor main body 2 in the longitudinal direction X will be referred to as "longitudinally outward".

The resistor main body 2 comprises a resistor element 21, and a pair of cap electrodes 22 fitted to both ends of the resistor element 21. In the present embodiment, the resistor element 21 is a so-called wire wound resistor element. The resistor element 21 comprises a core 211 having electric insulation, and a winding wire 212 spirally wound around an outer periphery of the core 211. For example, the core 211 is composed of a material having electric insulation such as ceramic with a cylindrical shape. The winding wire 212 is composed of wires such as nichrome wire. In the meantime, the resistor element 21 is not limited to the wire wound resistor element. For example, the resistor element 21 may be a ceramic resistor element without the winding wire 212, for example, may be composed of a ceramic having electrical conductivity with a pillar shape.

The cap electrode 22 is composed of an electrically conductive metal, etc. The cap electrode 22 comprises a disk-shaped bottom portion 221 which is orthogonal to the longitudinal direction X, a cylindrical side portion 222 extending longitudinally inward from a rim of the bottom portion 221. The cap electrode 22 is formed in a cap shape. In addition, the cap electrode 22 is opened at a side opposite to the bottom portion 221 in the side portion 222. The pair of cap electrodes 22 are fitted to the both ends of the resistor element 21 in the longitudinal direction X. In the state where the pair of cap electrodes 22 are fitted to the resistor element 21, the side portion 222 electrically contacts the winding wire 212 of the resistor element 21, and thus the cap electrode 22 is electrically connected to the winding wire 212. Note that the cap electrode 22 may be connected to the winding wire 212 by welding etc., in the state where the pair of cap electrodes 22 are fitted to the resistor element 21.

A flange 23 is formed at an end opposite to the bottom portion 221 in the side portion 222 of the cap electrode 22 to extend radially outwardly from the side portion 222. The flange 23 is formed in a plate-shape having a thickness in the longitudinal direction X. In the present embodiment, the flange 23 is integrally formed with the cap electrode 22. For example, the cap electrode 22 and the flange 23 can be formed at the same time by pressing a single plate. However, the present invention is not limited thereto, and the flange 23 and the cap electrode 22 may be formed separately (i.e., as separate pieces). In this case, the flange 23 may be connected to the cap electrode 22 by welding, etc.

The flange 23 comprises an exposed terminal 20 exposed from the resin portion 3. As shown in FIG. 3, the exposed terminal 20 is inserted into a through hole 110 of the circuit board 11, and is connected to the circuit board 11 by using a solder 12, or the like. In the present embodiment, a direction where a tip end of the exposed terminal 20 faces will be referred to as a vertical direction Z. One side in the vertical direction Z to which the tip end of the exposed terminal 20 faces will be referred to as "lower side" or "downward", and an opposite side of that will be referred to as "upper side" or "upward". In the meantime, the descriptions according to the "upper" and the "lower" are merely for convenience. For example, the above expression does not limit the posture of the resistor 1 with respect to a normal direction when using the resistor 1. However, in the present embodiment, the resistor 1 is assumed to be used in a posture that the vertical direction Z is served as the normal direction, the "upward" in the vertical direction Z is served as "upward" in the normal direction, and the "downward" in the vertical direction Z is served as "downward" in the normal direction. The portion other than the exposed terminal 20 of the resistor main body 2 is embedded in the resin portion 3.

The resin portion 3 comprises a rectangular column-shaped resin main body 31 formed lengthy in the longitudinal direction X and embedding the resistor main body 2 therein, and a plurality of radiation fins 32 protruded from the resin main body 31. In the present embodiment, the resin portion 3 is formed as a single resin molded article, and comprises the resin main body 31 and the plurality of radiation fins 32 integrally (i.e., as one piece). The resin portion 3 is a molded resin in which the resin main body 31 and the plurality of radiation fins 32 are formed at the same time by injecting a molten resin in a cavity and curing the resin in the state where the resistor main body 2 is accommodated in the mold.

The plurality of radiation fins 32 are protruded toward an opposite side (i.e., upward) to the tip end side of the exposed terminal 20 (i.e., downward). The radiation fin 32 is lengthy in the longitudinal direction X, and formed continuously from one end to the other end of the resin portion 3 in the longitudinal direction X. A space between the adjacent radiation fins 32 is opened at both sides in the longitudinal direction X. The plurality of radiation fins 32 are arranged at equal intervals and to be parallel each other. The radiation fin 32 is configured in such a manner that a protrusion length from the resin main body 31 is longer than a thickness of the radiation fin 32.

Figure 4:
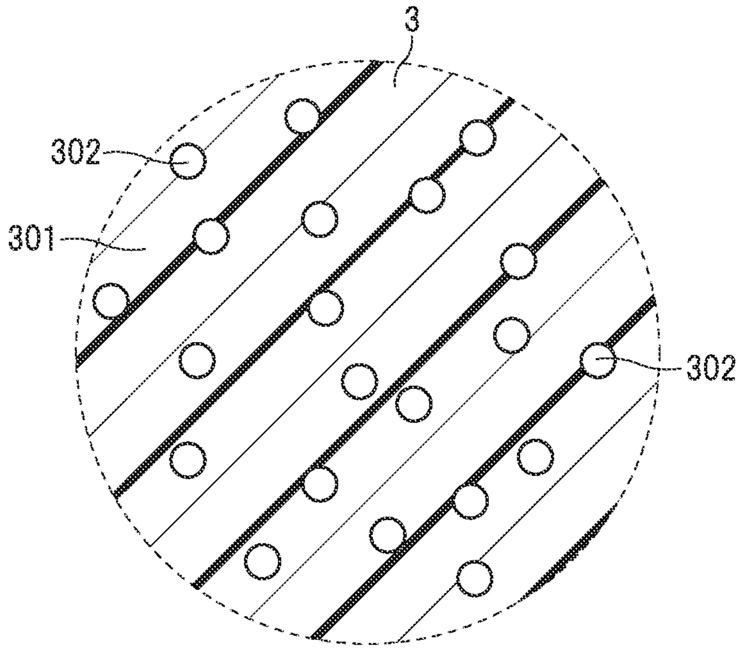
FIG. 4 is an enlarged schematic view showing a part of a cross-section of a resin portion according to the first embodiment.

FIG. 4 is a schematic view showing a part of cross-section of the resin portion 3 with enlarging. As shown in FIG. 4, the resin portion 3 is formed by adding a filler 302 having thermal conductivity in a base resin 301 having electric insulation. The base resin 301 may be composed of, e.g., resins having electric insulation such as Polyphenylene-sulfide (PPS) resin, epoxy resin. The filler 302 may be composed of, e.g., metallic powder, ceramic powder. Specifically, the filler 302 may be composed of powder such as aluminum oxide powder, boron nitride powder, aluminum nitride powder. In FIG. 4, the filler 302 is illustrated to have a circular-shape for convenience. However, the shape of filler 302 is not limited thereto.

Because of the filler 302 with thermal conductivity being included in the resin portion 3, the thermal conductivity in the entire resin portion 3 can be improved and the high temperature inside the resistor 1 can be prevented. In the present embodiment, the thermal conductivity of the resin portion 3 is higher than the thermal conductivity of cement, for example, 2 W/(m·K) or more, preferably, 3 W/(m·K) or more. In addition, the thermal conductivity of the resin portion 3 can be set at 10 W/(m·K) or less.

General cement resistor is made by filling cement in a case, and cement adheres to the case. The resistor 1 in the present embodiment does not have a case to adhere to the resin portion 3 and house the resin portion 3. Hereby, it is possible to suppress the increase in size of the resistor 1. Note that it is possible to assemble the resistor 1 to a case manufactured separately (i.e., as a separate piece) from the resistor 1 when using the resistor 1. In this case, the resistor 1 is detachably attached to the case. However, the resistor 1 per se without the case is formed in a small size.

For example, the resistor 1 can be configured to be arranged within an engine room of a vehicle. In this case, for example, the resistor 1 may be arranged in a motor wiring for connecting a stator coil of a motor and a terminal block of the motor, to constitute a snubber circuit for suppressing a surge voltage. When the resistor 1 is arranged in high-temperature environments such as in the engine room, the environmental temperature of the resistor 1 becomes high and the resistor 1 is required to have high heat dissipation property. Thus, the resistor 1 according to the present embodiment is suitably used. In the state where the resistor 1 is attached to the circuit board 11, a lower surface of the rectangular column-shaped resin portion 3 faces the circuit board 11. The heat generated from the resistor 1 is transferred to the resin portion 3 and dissipated especially from a portion where the radiation fin 32 is provided to the air around the resistor 1 and the like, and the heat is transferred to the circuit board to be dissipated.

Note that the resistor 1 may be attached to an attaching object (i.e., attaching target member) other than the circuit board 11. In this case, for example, when a contact surface of the attaching object contacting the resistor 1 has a non-planar shape such as a curved surface, the contact surface of the resin portion 3 contacting the attaching object can be formed to have a shape in accordance with the non-planar shape of the resistor 1. In addition, the resin portion 3 may have a specific shape other than the rectangular column shape.

Next, a method for manufacturing the resistor 1 according to the present embodiment will be explained. In the method for manufacturing the resistor 1 according to the present embodiment, the resistor main body 2 is manufactured and provided in the mold. As the mold, it is possible to use two dies configured to reciprocate along a protruding direction of the exposed terminal 20 (i.e., the vertical direction Z). A lower die is provided with an insertion hole to which the exposed terminal 20 is inserted. The resistor main body 2 is arranged in the lower die by inserting the exposed terminal 20 into the lower die. An upper die is provided with convex and concave portions to form the plurality of radiation fins 32. After the resistor main body 2 is accommodated in the mold, the resin portion 3 is formed integrally with the resistor main body 2 by insert molding, which comprises a step of injecting the molten resin in a cavity and a step of curing the resin. As described above, it is possible to manufacture the resistor 1 according to the present embodiment.

In addition, for improving the removal of the upper die after the resin portion 3 is molded, the plurality of radiation fins 32 may be provided with a draft angle. For example, the radiation fin 32 may be configured in such a manner that surfaces other than the upper surface are inclined to decrease the thickness and the length in the longitudinal direction X toward the upper side.

Functions and Effects of the First Embodiment

In the resistor 1 according to the present embodiment, the resin portion 3 comprises the radiation fin 32. Therefore, a surface area of the resistor 1 is increased and thus the dissipation of the resistor 1 is improved. In addition, it is possible to easily form the radiation fin 32 by molding by providing the radiation fins 32 at the resin portion 3. In addition, the degree of freedom in forming the radiation fin 32 is improved by the configuration in which the resin portion 3 is provided with the radiation fin 32.

In addition, the radiation fin 32 is formed lengthy in the longitudinal direction X. Thus, the surface area of the resin portion 3 is increased easily, so that the heat dissipation property of the resistor 1 is improved.

Further, the resin portion 3 comprises the radiation fin 32 protruding toward the opposite side to the tip end side of the exposed terminal 20. That is, the resin portion 3 comprises the radiation fin 32 protruding toward an opposite side to the attaching object of the resistor 1 (in the present embodiment, the circuit board 11). Therefore, it is possible to improve the heat dissipation property of the resistor 1 since the heat of the resistor 1 is dissipated from one side to the attaching object and dissipated from the other side to the air by the radiation fin 32.

Further, the resin portion 3 comprises the base resin 301, and the filler 302 having the thermal conductivity higher than the thermal conductivity of the base resin 301. Thus, the heat dissipation property of the resistor 1 is improved.

Furthermore, the thermal conductivity of the resin portion 3 is 3 W/(m·K) or more. It is possible to improve the heat dissipation property of the resistor 1 by setting the thermal conductivity of the resin portion 3 at 3 W/(m·K) or more. In addition, it is possible to reduce the cost of the resin portion 3 and improve the formability of the resin portion 3 by setting the thermal conductivity of the resin portion 3 at 10 W/(m·K) or less. It is necessary to include a large amount of filler 302 to increase the thermal conductivity of the resin portion 3. However, as increasing the amount of the filler 302, the cost of manufacturing the resin portion 3 increases, and the fluidity of molten material for the resin portion 3 becomes worse so the formability of the resin portion 3 tends to become worse. Thus, it is possible to reduce the cost of manufacturing the resin portion 3 and improve the formability, by setting the thermal conductivity of the resin portion 3 at 10 W/(m·K) or less.

As described above, according to the present embodiment, it is possible to provide a resistor that can improve the heat dissipation property.

Second Embodiment

Figure 5:
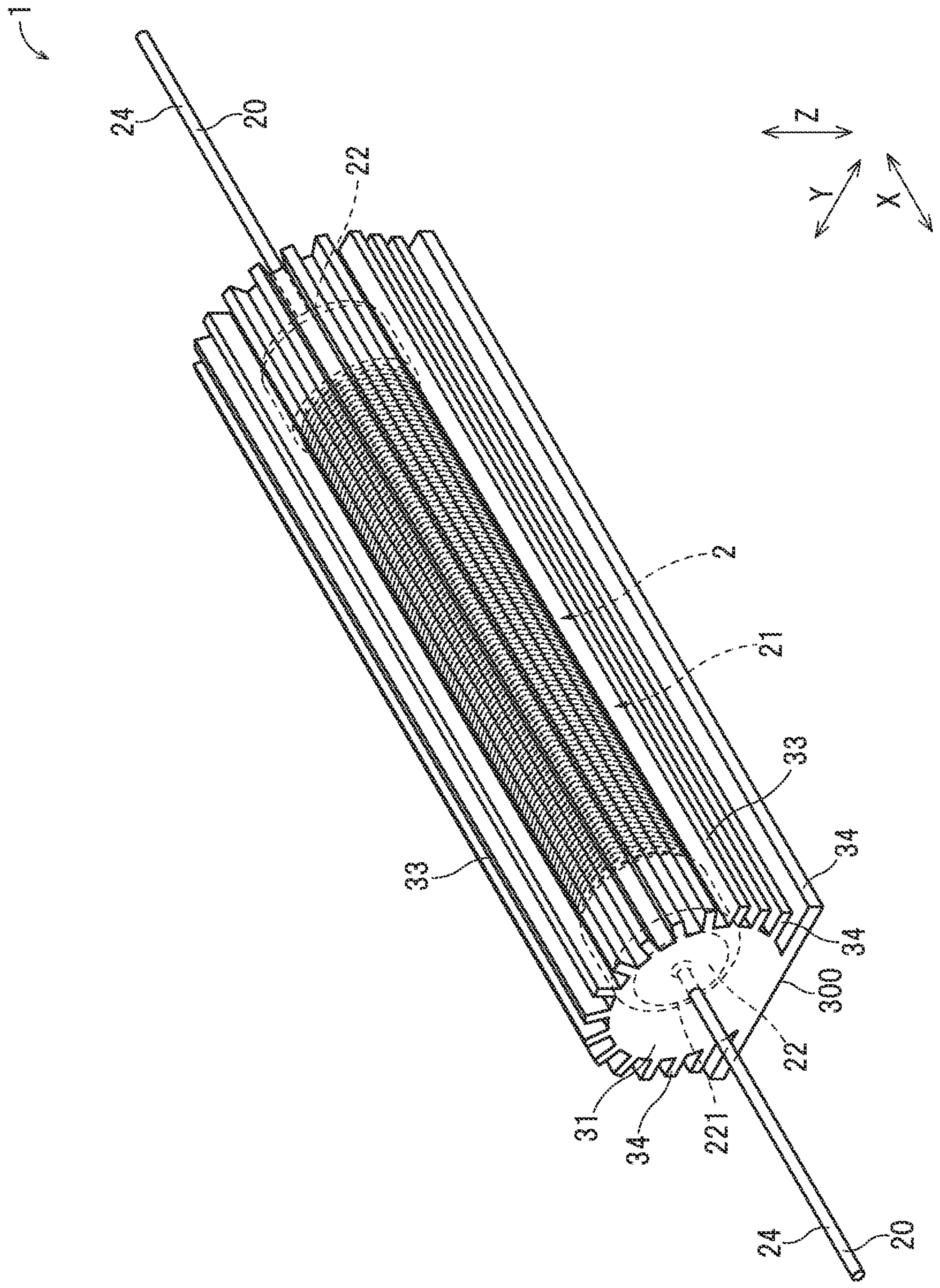
FIG. 5 is a perspective view showing a resistor according to the second embodiment.
Figure 6:
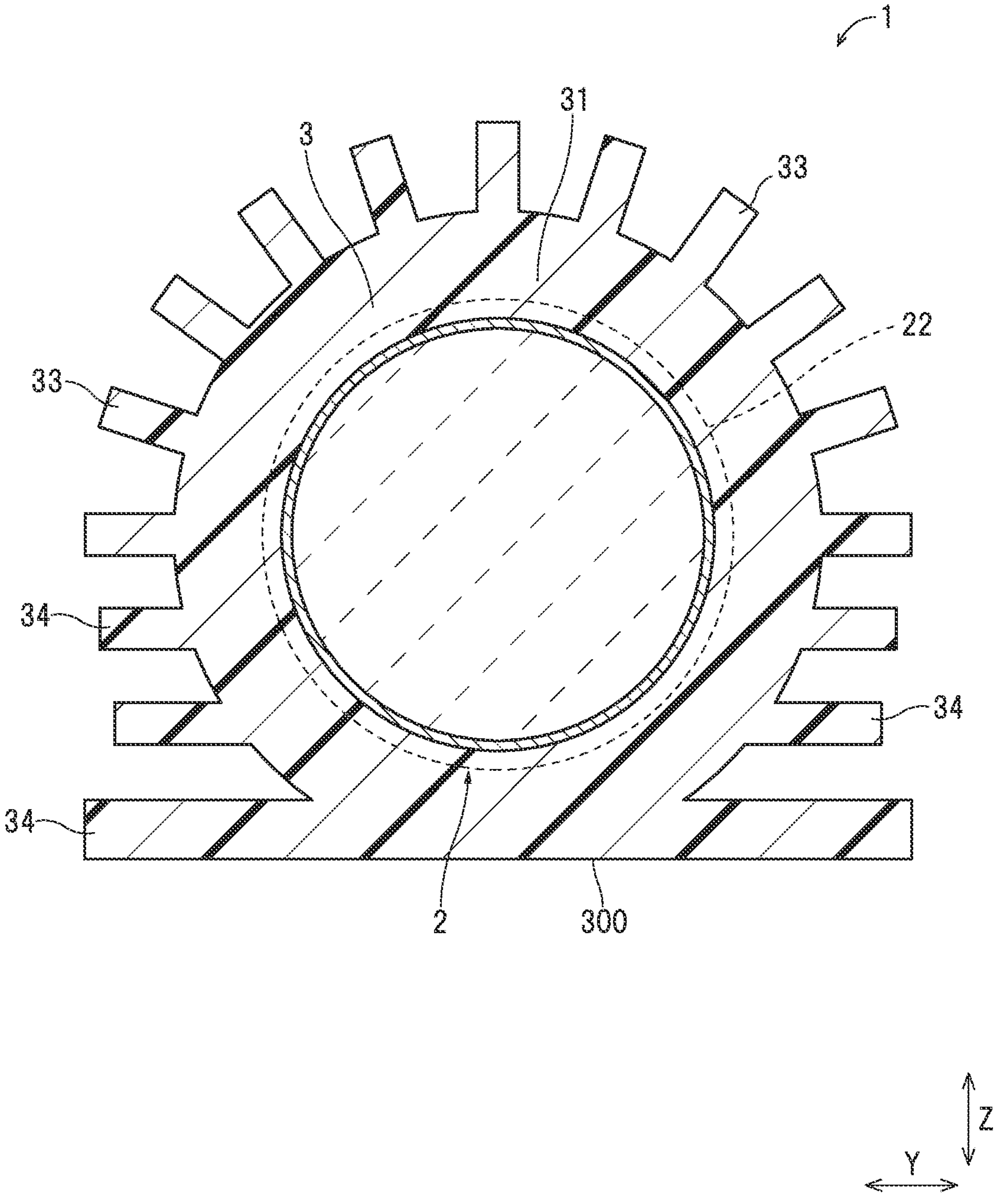
FIG. 6 is a cross-sectional view showing the resistor according to the second embodiment in a direction orthogonal to the longitudinal direction of the resistor.

FIG. 5 is a perspective view showing the resistor 1 according to the present embodiment. FIG. 6 is a cross-sectional view showing the resistor 1 in a direction orthogonal to the longitudinal direction of the resistor 1.

The resistor main body 2 according to the present embodiment comprises a pair of lead wires 24 respectively connected to a pair of cap electrodes 22. The lead wire 24 is jointed to a bottom portion 221 of the cap electrode 22 by welding or the like. The lead wire 24 is composed of a conductor wire such as tin-plated wire. In the pair of lead wires 24, a portion opposite to the cap electrode 22 is the exposed terminal 20 exposed outside the resin portion 3. Although FIG. 5 shows the pair of lead wires 24 that are respectively linear, for example, the exposed terminal 20 in the pair of lead wires 24 bends toward the direction orthogonal to the longitudinal direction X and is inserted and connected to a through hole or the like of the circuit board, in using the resistor 1. In the present embodiment, a direction where a tip end of the bent exposed terminal 20 as described above faces will be referred to as the vertical direction Z. In the meantime, the vertical direction Z is a normal direction of a main surface 300 of the resin portion 3. In the present embodiment, a side to which the main surface 300 faces will be referred to as a lower side and the opposite side of that will be referred to as an upper side. In addition, a direction orthogonal to both the longitudinal direction X and the vertical direction Z is referred to as a lateral direction Y. In addition, the main surface 300 is a facing surface that faces the attaching object when the resistor 1 is attached to the attaching object such as the circuit board.

In the present embodiment, the resin main body 31 is formed in a columnar shape which is lengthy in the longitudinal direction X. The plurality of radiation fins 33, 34 are protruded from the resin main body 31 radially outwardly.

The plurality of radiation fins 33, 34 includes the plurality of radiation fins 33 formed radially at an upper half of the resin portion 3, and the plurality of radiation fins 34 that are formed beneath the plurality of radiation fins 33 and protruded from the resin main body 31 toward both sides in the lateral direction Y. The plurality of radiation fins 33 are formed radially when viewed from the longitudinal direction X. The plurality of radiation fins 33 are formed at equal angle pitches around a predetermined center axis. The radiation fins 33 have protrusion lengths equal to each other. Of the radiation fins 33, a radiation fin 33 located at the center protrudes toward a side opposite to the protrusion of the bent exposed terminal 20 (i.e., the upper side). In addition, a pair of radiation fins 33 located at the lowermost of the plurality of radiation fins 33 protrude from both sides in the lateral direction Y and are formed in parallel to the plurality of radiation fins 34. The protrusion length of the radiation fin 34 is longer as being located lower. Bottom surfaces of the lowermost pair of radiation fins 34 constitute the main surface 300.

For example, the resistor 1 according to the present embodiment can be manufactured by arranging the resistor main body 2 in a pair of dies reciprocating in the longitudinal direction X and by insert molding, which comprises a step of injecting the molten resin in a cavity and a step of curing the resin.

The other structure according to the present embodiment is the same with the structure according to the first embodiment. In addition, the same reference signs used in previously presented from the reference signs used after the second embodiment will indicates elements in the embodiment previously presented unless otherwise specified.

Functions and Effects of the Second Embodiment

In the present embodiment, the resin portion 3 comprises the plurality of radiation fins 33 that are radially formed. Thus, it is possible to minimize the size of the resistor 1 without losing the heat dissipation property. Besides, the resistor 1 in the second embodiment has similar effects to those of the first embodiment.

In the present embodiment, the protrusion length of the lowermost pair of radiation fins 34 may be made longer than the length shown in FIGS. 5 and 6, and the radiation fin 34 is formed with a bolt insertion hole for inserting a bolt for attaching the resistor 1 to the attaching object. Similar change is applicable to the embodiments described below.

Third Embodiment

Figure 7:
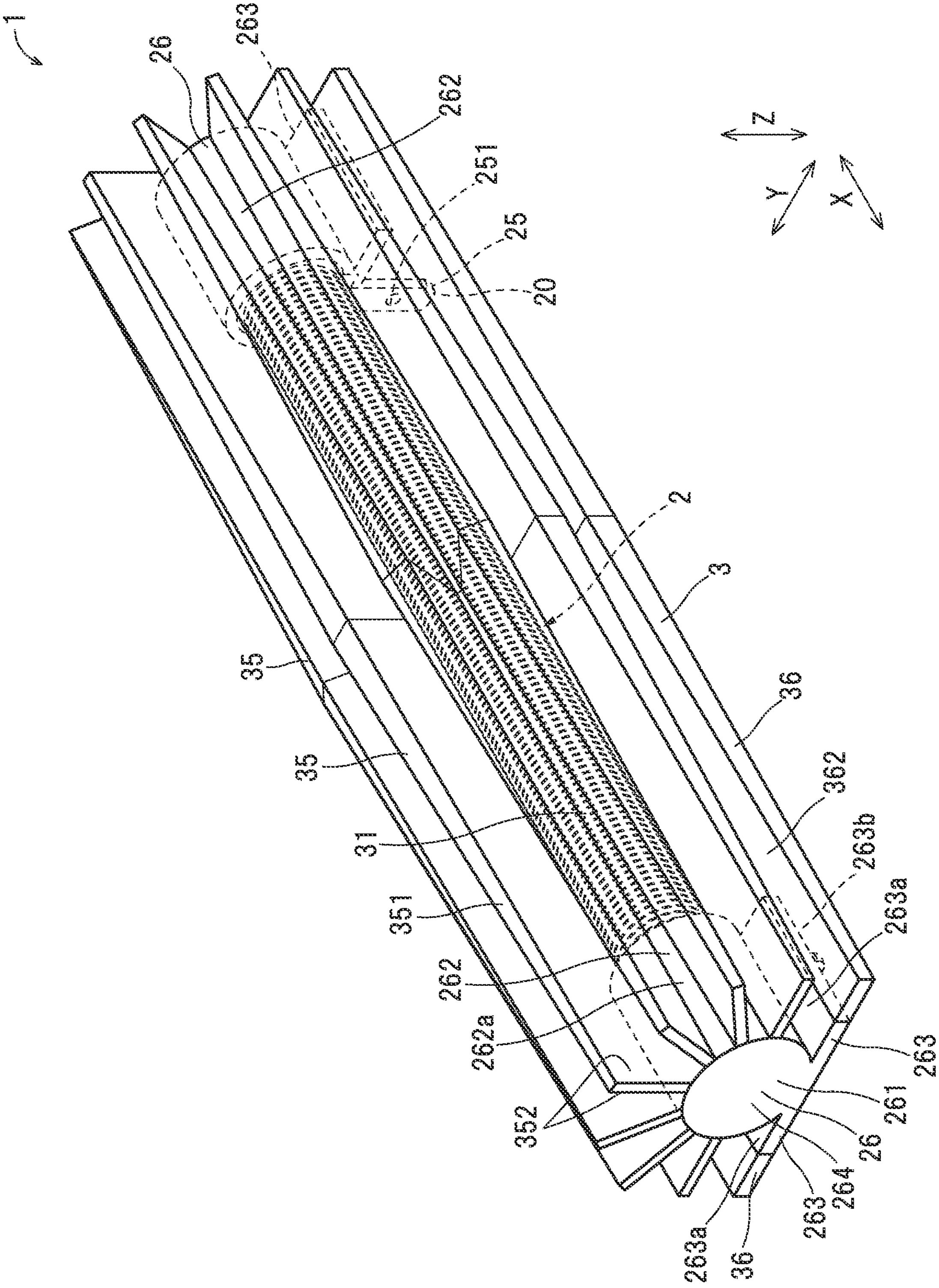
FIG. 7 is a perspective view showing a resistor according to the third embodiment.
Figure 8:
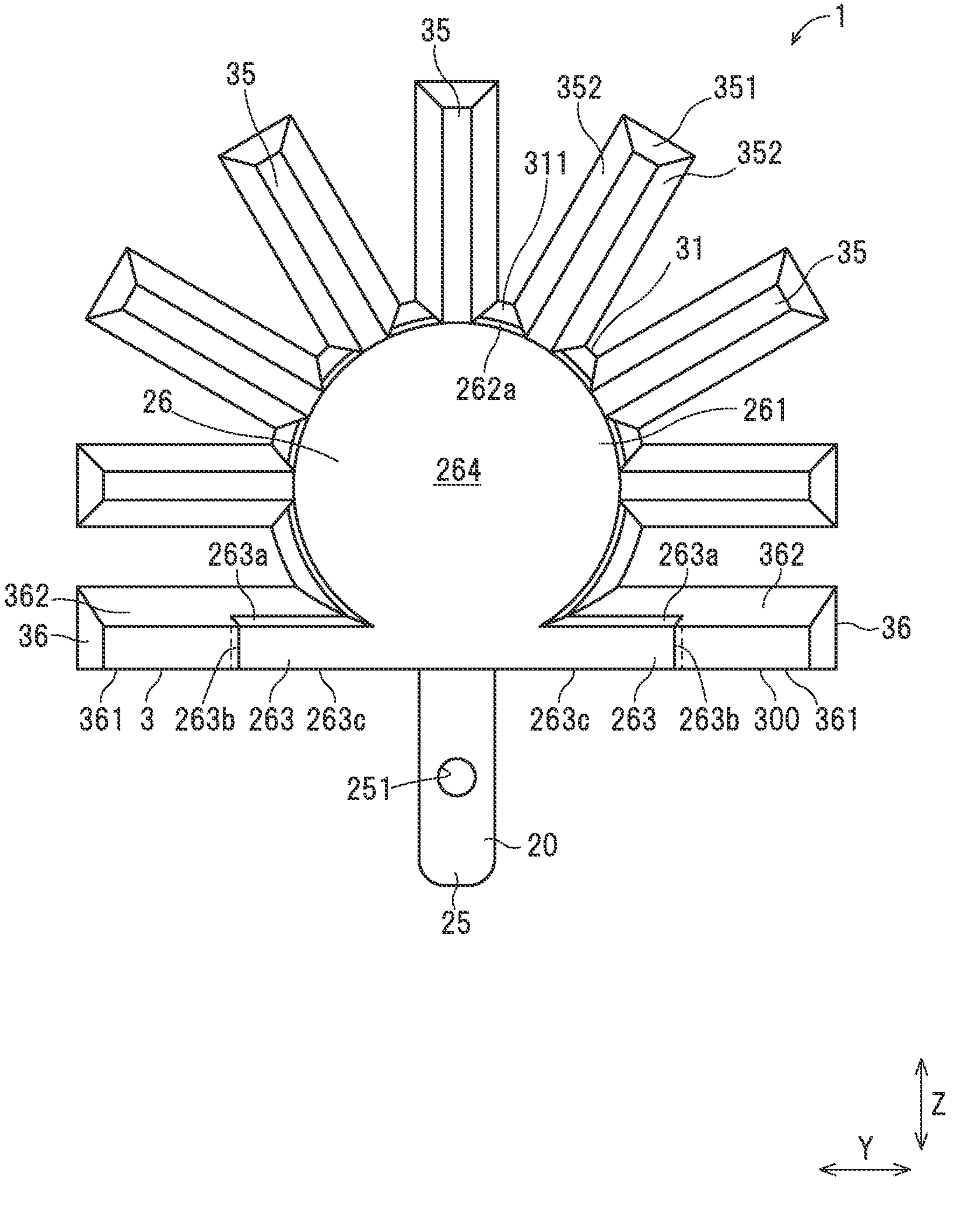
FIG. 8 is a front view showing the resistor according to the third embodiment.
Figure 9:
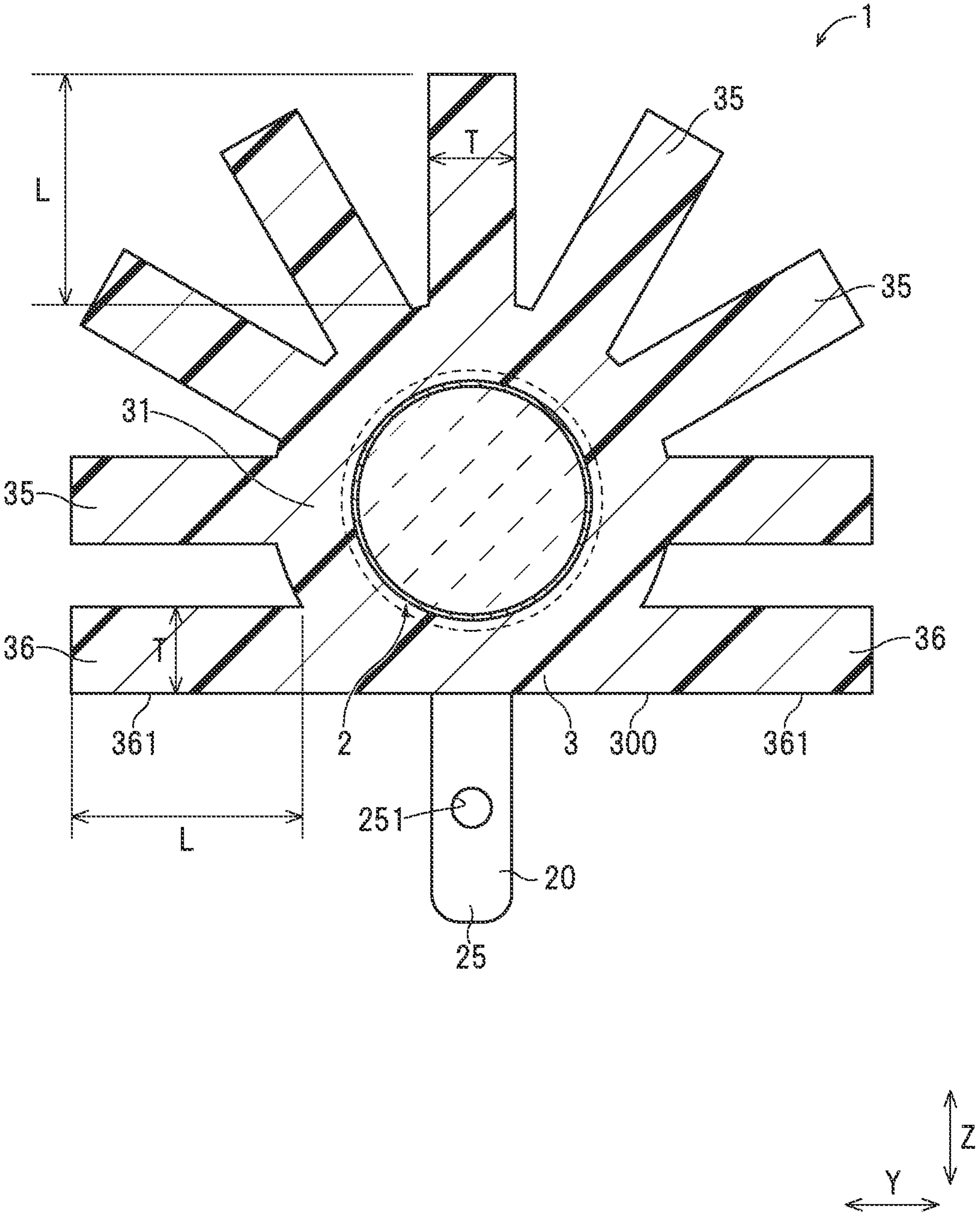
FIG. 9 is a cross-sectional view showing the resistor according to the third embodiment at a center position of the resistor in the longitudinal direction.
Figure 10:
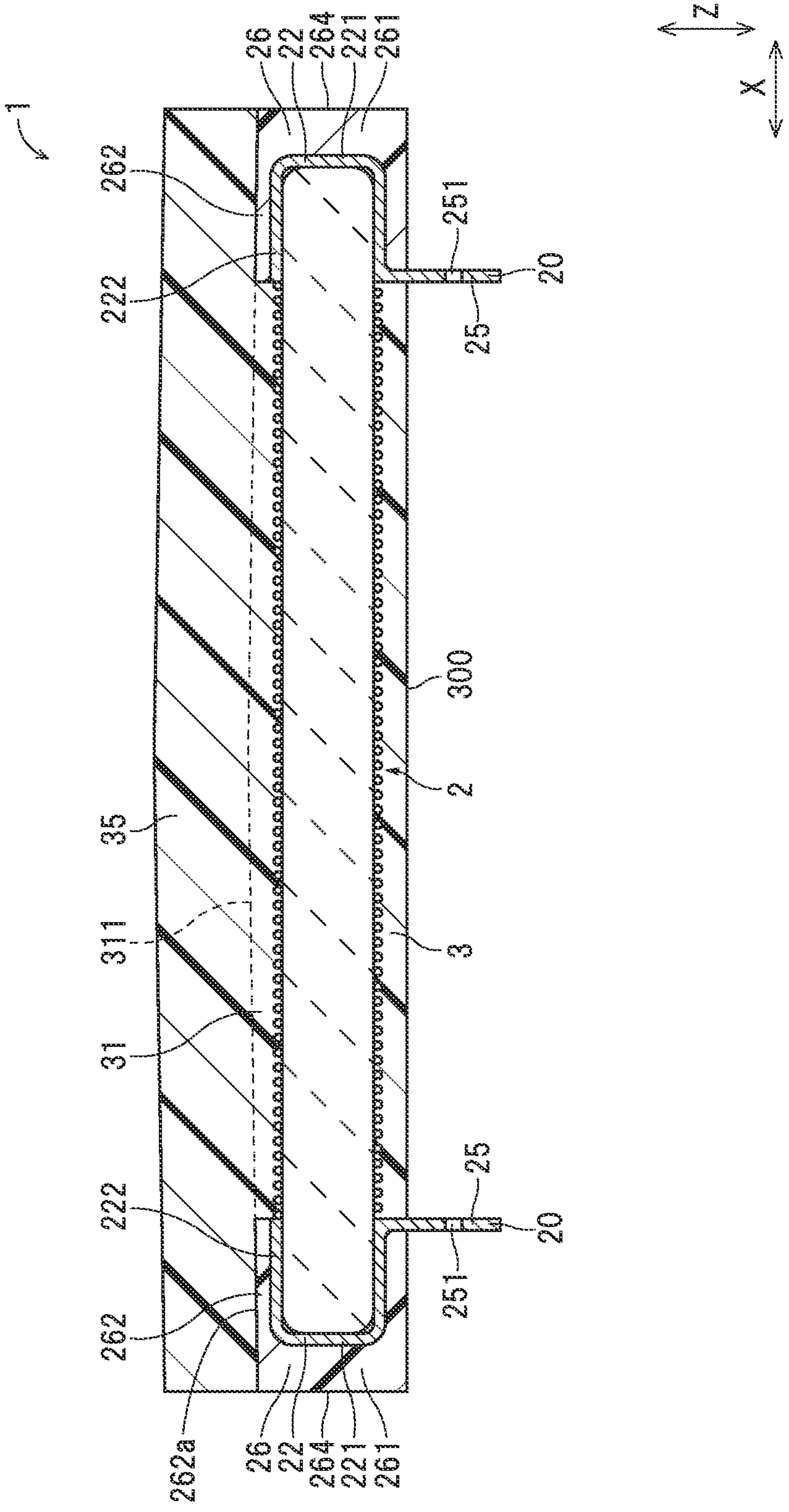
FIG. 10 is a cross-sectional view showing the resistor according to the third embodiment in a direction parallel to the longitudinal direction of the resistor.

FIG. 7 is a perspective view showing the resistor 1 according to the present embodiment. FIG. 8 is a front view showing the resistor 1. FIG. 9 is a cross-sectional view showing the resistor 1 at the center of the resistor 1 in the longitudinal direction. FIG. 10 is a cross-sectional view showing the resistor 1 in a direction parallel to the longitudinal direction of the resistor 1.

In the present embodiment, a configuration of the resistor 1 according to the second embodiment is modified to improve the formability.

The resistor main body 2 comprises a pair of protruding pieces 25 that respectively protrudes from a pair of cap electrode 22 toward one side orthogonal to the longitudinal direction X. The protruding piece 25 is extended from an end opposite to the bottom portion 221 in the side portion 222 of the cap electrode 22. In the present embodiment, the protruding piece 25 is formed integrally with the cap electrode 22. A protruding end of the protruding piece 25 is provided as the exposed terminal 20 exposed from the main surface 300 of the resin portion 3 to the outside of the resin portion 3. A locating hole (i.e., positioning hole) 251 for enabling the positioning with respect to the mold is provided in the exposed terminal 20. The positioning will be explained below. In the present embodiment, as with the first embodiment, the direction where the tip end of the exposed terminal 20 faces will be referred to as the vertical direction Z, one side in the vertical direction Z to which the main surface 300 faces will be referred to as the lower side, and the opposite side to the lower side will be referred to as the upper side. In addition, the direction orthogonal to both the longitudinal direction X and the vertical direction Z will be referred to as the lateral direction Y.

Nests 26 are respectively fitted to the pair of cap electrodes 22 of the resistor main body 2. The nest 26 is composed of a resin and formed in a cap shape to which the cap electrode 22 can be inserted. The nest 26 comprises a disk-shaped nest bottom portion 261 facing the bottom portion 221 of the cap electrode 22, and a cylindrical nest side portion 262 extended from a rim of the nest bottom portion 261 toward the longitudinal direction X and facing the side portion 222 of the cap electrode 22. The nest 26 further comprises a plate-shaped portion 263 having a thickness in the vertical direction Z at a lower end.

As shown in FIG. 10, an outer peripheral surface **262*a* of the nest side portion 262 is tapered to increase in outer diameter as advancing longitudinally inward. In addition, as shown in FIG. 8, an upper surface 263*a* of the plate-shaped portion 263 is inclined upward as advancing longitudinally inward. Further, end faces 263*b* at both sides of the plate-shaped portion 263 are inclined outward in the lateral direction Y as advancing longitudinally inward. The nest 26 is configured in such a manner that an end face 264 which is located longitudinally outward, and the upper surface 263*a* and the lower surface 263*c* of the plate-shaped portion 263 are exposed from the resin portion 3. In addition, the nest 26 is configured in such a manner that a portion absent of the plurality of radiation fins 35, 36 at the outer peripheral surface 262*a* of the nest side portion 262 is exposed from the resin portion 3. The other portions of the nest 26 are covered in the resin portion 3**.

The resin portion 3 comprises a column-shaped resin main body 31 embedding the resistor main body 2 therein, and the plurality of radiation fins 35, 36 protruded from the resin main body 31. As shown in FIG. 10, the resin main body 31 is formed between the pair of nests 26.

As shown in FIGS. 7 to 9, each of the resin portions 3 comprises the plurality of radiation fins 35 radially protruded when viewed from the longitudinal direction X, and the plurality of radiation fins 36 formed at the bottom end of the resin portion 3 and protruded toward both sides in the lateral direction Y. The plurality of radiation fins 35 are formed at an equal angle pitch around a predetermined center axis. As shown in FIG. 9, in the cross-section of the resistor 1 in a direction orthogonal to the longitudinal direction X, a length L of each of the radiation fins 35, 36 is not less than two times, preferably not less than two and half times the maximum thickness T of each of the radiation fins 35, 36. Of the radiation fins 35, the lowermost pair of radiation fins 35 protrude from both sides in the lateral direction Y and are formed in parallel to the plurality of radiation fins 36. As shown in FIG. 10, both ends of the radiation fin 35 in the longitudinal direction X protrude from both sides of the resin main body 31 in the longitudinal direction X and adheres to the outer peripheral surface **262*a* of the nest side portion 262**.

As shown in FIG. 9, the radiation fin 36 is configured in such a manner that a position of the protruding end is at the same location in the lateral direction Y as the lowermost radiation fin 35 of the plurality of radiation fins 35 in the cross-section of the resistor 1 in a direction orthogonal to the longitudinal direction X. The lower surface 361 of a pair of radiation fins 36 makes the main surface 300 of the resin portion 3. As shown in FIG. 7, both ends of the radiation fin 36 in the longitudinal direction X protrude from the resin main body 31 toward both sides of that in the longitudinal direction X, and adhere to the both side surfaces 263*b* of the plate-shaped portion 263 of the nest 26 in the lateral direction Y.

In addition, as described below, a draft for easily removing the stationary die 5 and the movable die 6 described below in manufacturing the resistor 1 is formed on a surface of the resin portion 3. Firstly, as shown in FIG. 10, an outer peripheral surface 311 (except the main surface 300) of the resin main body 31 is formed with an inclination such that the outer diameter increases as advancing toward the center position in the longitudinal direction A of the resistor 1. A taper angle of the outer peripheral surface 311 of the resin main body 31 is substantially equal to a taper angle of the outer peripheral surface 262*a* of the nest side portion 262. The outer peripheral surface 311 of the resin main body 31 is flush with the outer peripheral surface 262*a* of the nest side portion 262. Furthermore, as shown in FIGS. 7 and 8, a protruding side end surface 351 and both side surfaces 352 of the radiation fin 35 are inclined to increase the thickness and protrusion length as advancing longitudinally inward. An upper surface 362 of the radiation fin 36 is inclined upward as advancing longitudinally inward. Furthermore, the inclined angle of the upper surface 362 of the radiation fin 36 to the longitudinal direction X is substantially equal to the inclined angle of the upper surface 263*a* of the plate-shaped portion 263 of the nest 26 to the longitudinal direction X. The upper surface 362 of the radiation fin 36 is flush with the upper surface 263*a* of the plate-shaped portion 263 of the nest 26. The other configuration of the resistor 1 is similar to the first embodiment.

Figure 11:
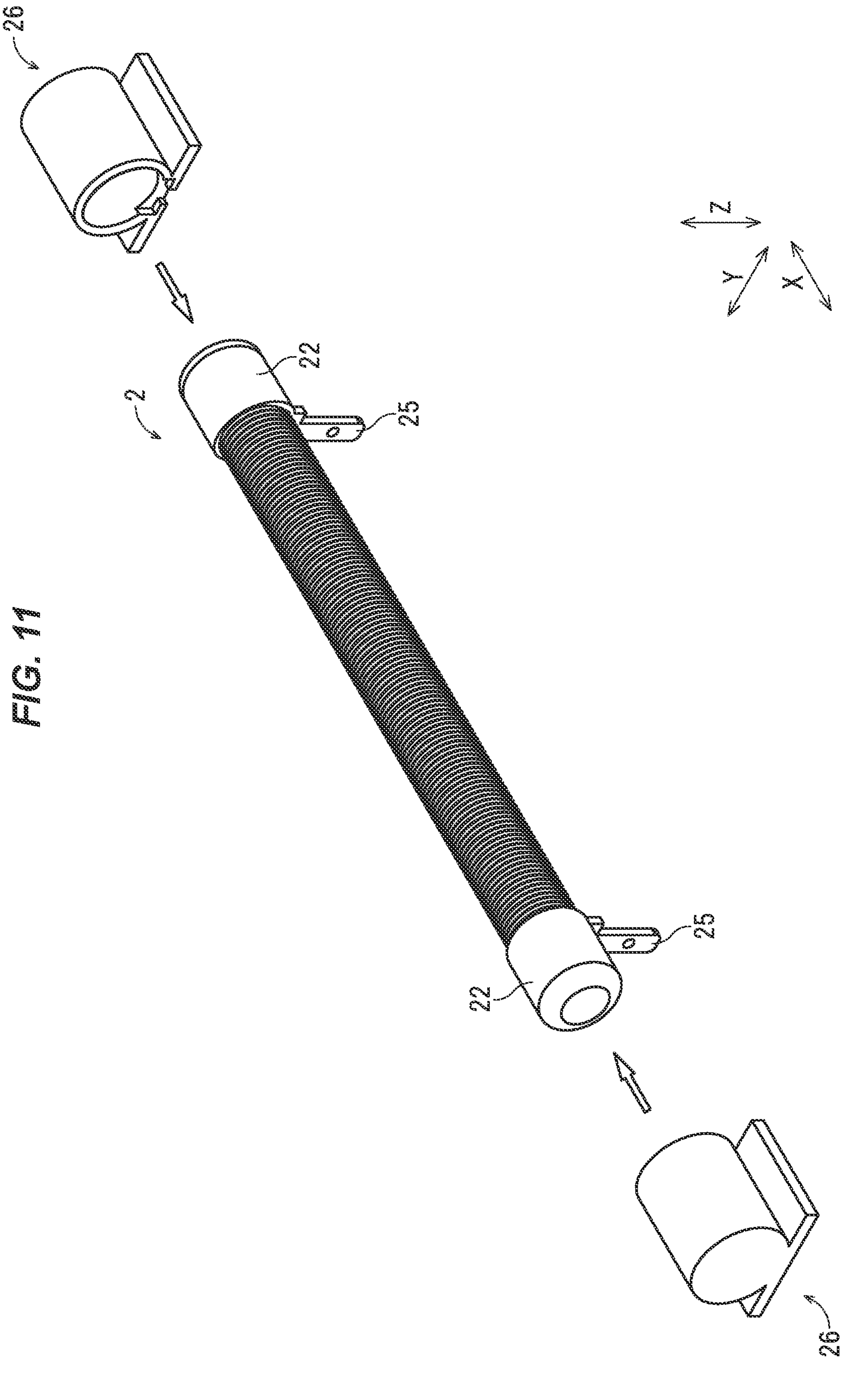
FIG. 11 is an exploded perspective view showing a resistor main body and a pair of nests according to the third embodiment.

Next, the method for manufacturing the resistor 1 in the present embodiment will be explained. FIG. 11 is an exploded perspective view showing the resistor main body 2 and a pair of nests 26. The pair of nests 26 are fitted to a pair of cap electrodes 22 of the resistor main body 2. Hereinafter, an assembly in which the pair of nests 26 are fitted to the resistor main body 2 will be referred to as a resistor assy (i.e., resistor assembly) 4.

Figure 12:
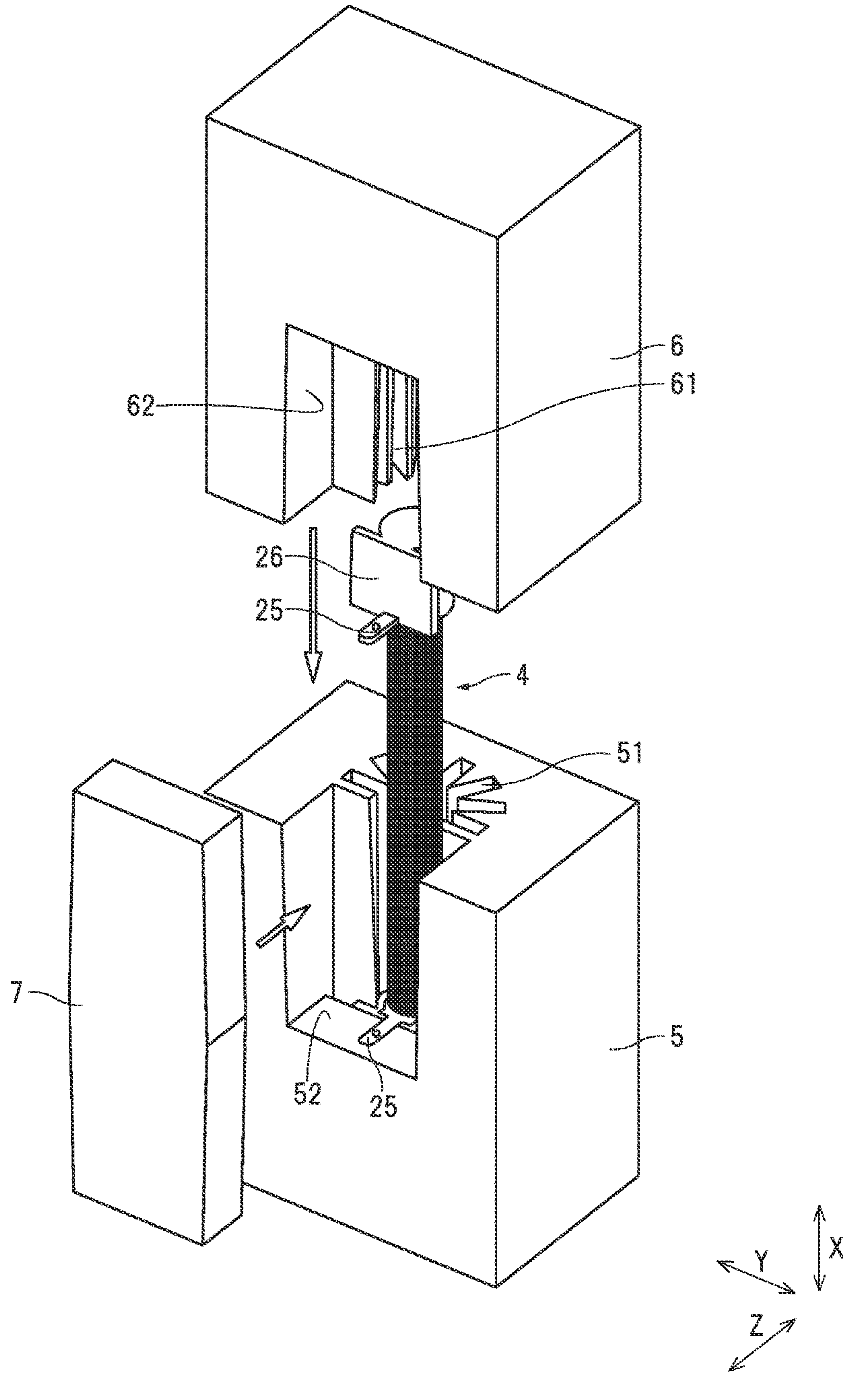
FIG. 12 is a perspective view showing a stationary die, a movable die, a sliding core, and a resistor assembly (i.e., assy) according to the third embodiment before mold closing.
Figure 13:
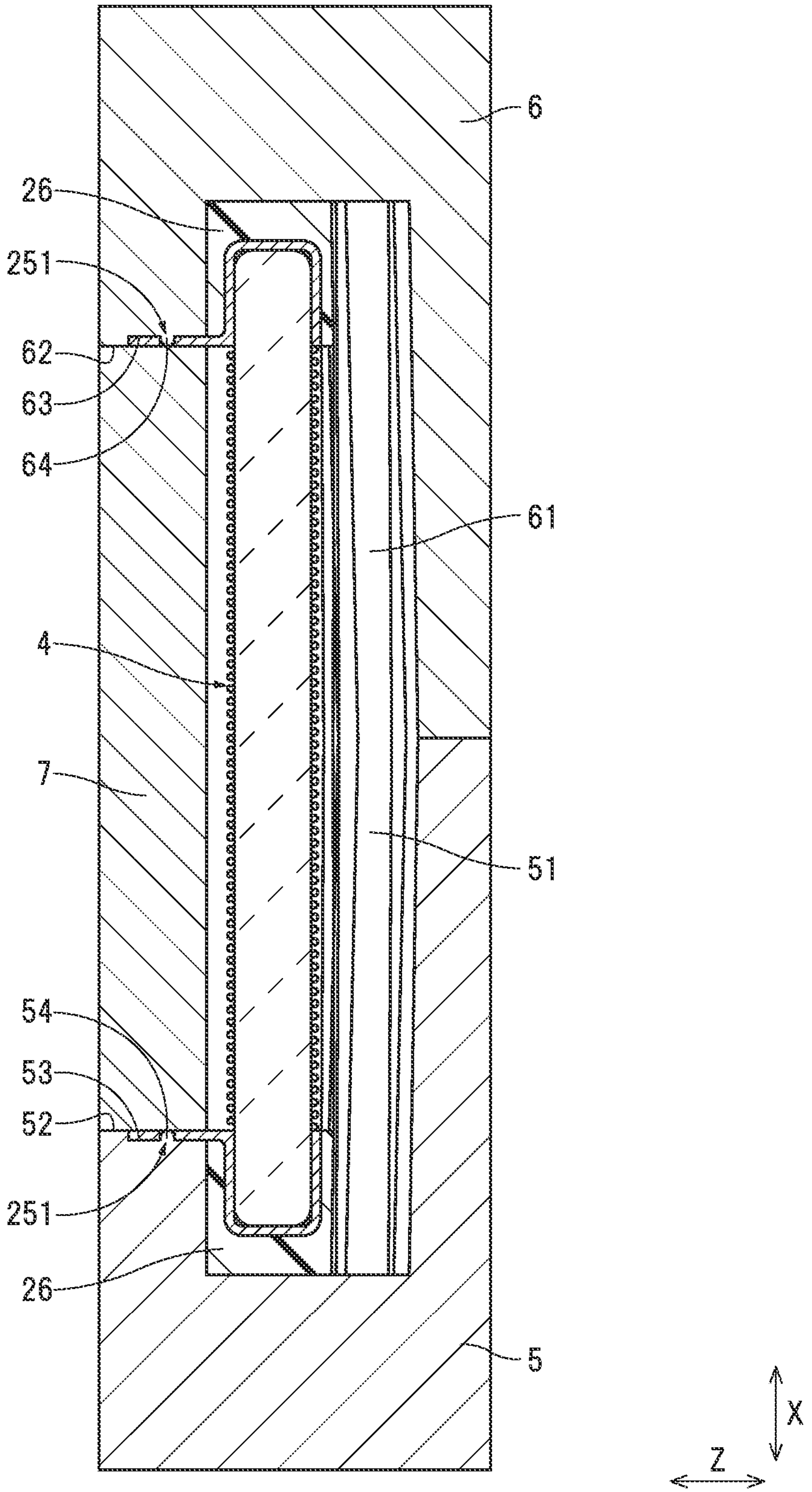
FIG. 13 is a perspective view showing the stationary die, the movable die, the sliding core, and the resistor assembly according to the third embodiment after mold closing.

FIG. 12 is a perspective view showing the stationary die 5, the movable die 6, a sliding core 7, and the resistor assy 4 before mold closing. FIG. 13 is a perspective view showing the stationary die 5, the movable die 6, the sliding core 7, and the resistor assy 4 after mold closing.

After the resistor assy 4 is obtained, as shown in FIG. 12, the resistor assy 4 is arranged in the stationary die 5. The stationary die 5 is formed with a stationary side cavity surface 51 opening toward a removal direction (the longitudinal direction X) of the movable die 6. The stationary side cavity surface 51 has a shape corresponding to an outer shape of a half member of the resin portion 3 to form the half member of the resin portion 3. In addition, the stationary die 5 is formed with a stationary side opening 52 that communicates to an inner space of the stationary side cavity surface 51 and opens toward a removal direction (the vertical direction Z) of the sliding core 7. As shown in FIG. 13, a stationary side arrangement concavity 53 to arrange one of the protruding pieces 25 is formed at an inner surface of the stationary side opening 52. A stationary side pin 54 to be inserted into the locating hole 251 of the protruding piece 25 is formed at the stationary side arrangement concavity 53. The resistor assy 4 is positioned with respect to the stationary die 5 by inserting the stationary side pin 54 into the locating hole 251 of the protruding piece 25. Furthermore, in the resistor assy 4, a surface exposed from the resin portion 3 in the nest 26 abuts the stationary die 5. The resistor assy 4 is moved along the longitudinal direction X of the resistor main body 2 and arranged in the stationary die 5. And then, the movable die 6 is advanced toward the stationary die 5 along the longitudinal direction X and the mold closing is completed.

As shown in FIG. 12, The movable die 6 is formed with a movable side cavity surface 61 opening toward the stationary side cavity surface 51. The movable side cavity surface 61 has a shape corresponding to an outer shape of a half member of the resin portion 3 to form the half member of the resin portion 3. In addition, the movable die 6 is formed with a movable side opening 62 that communicates to an inside space of the movable side cavity surface 61 and opens toward the removal direction of the sliding core 7. As shown in FIG. 13, a movable side arrangement concavity 63 to arrange the other one of the protruding pieces 25 different from the protruding piece 25 located by the stationary die 5 is formed at an inner surface of the movable side opening 62. A movable side pin 64 to be inserted into the locating hole 251 of the protruding piece 25 is formed at the movable side arrangement concavity 63. The resistor assy 4 is positioned with respect to the movable die 6 by inserting the movable side pin 64 into the locating hole 251 of the protruding piece 25. Furthermore, in the resistor assy 4, a surface exposed from the resin portion 3 in the nest 26 abuts on the movable die 6.

After the movable die 6 is fastened (i.e., mold-closed) to the stationary die 5, the sliding core 7 is inserted into the stationary side opening 52 and the movable side opening 62. The side surface of the sliding core 7, an inner surface of the stationary side opening 52, and an inner surface of the movable side opening 62 are formed with a draft for easily removing the sliding core 7 from the stationary side opening 52 and the movable side opening 62. After the sliding core 7 is tightened by the stationary die 5 and the movable die 6, the resin portion 3 is formed by insert molding by injecting a molten resin into a region surrounded by the stationary side cavity surface 51, the movable side cavity surface 61, and sliding core 7, and curing the resin. After the resin portion 3 is molded, the sliding core 7 is removed from the stationary side opening 52 and the movable side opening 62, and the movable die 6 is moved away from the stationary die 5 along the longitudinal direction X so that the resistor 1 can be taken away from the stationary die 5.

Functions and Effects of the Third Embodiment

The length L of each of the radiation fins 35, 36 is not less than two times the maximum thickness T of each of the radiation fins 35, 36 in the cross-section of the resistor 1 in a direction orthogonal to the longitudinal direction X. Thus, it is possible to easily increase an entire surface area of the resistor 1 and easily improve the heat dissipation property of the resistor 1. In addition, by forming the radiation fins 35, 36 as a part of the resin portion 3, it is possible to easily form the radiation fin 35, 36 each having a long protrusion length as described above by molding. Furthermore, since the inclination to improve the removal of the stationary die 5 and the movable die 6 is formed at the surface of the resin portion 3, and thus it is possible to more easily form the resin portion 3. Besides, the similar effects to the first embodiment and the second embodiment can be obtained.

Fourth Embodiment

Figure 14:
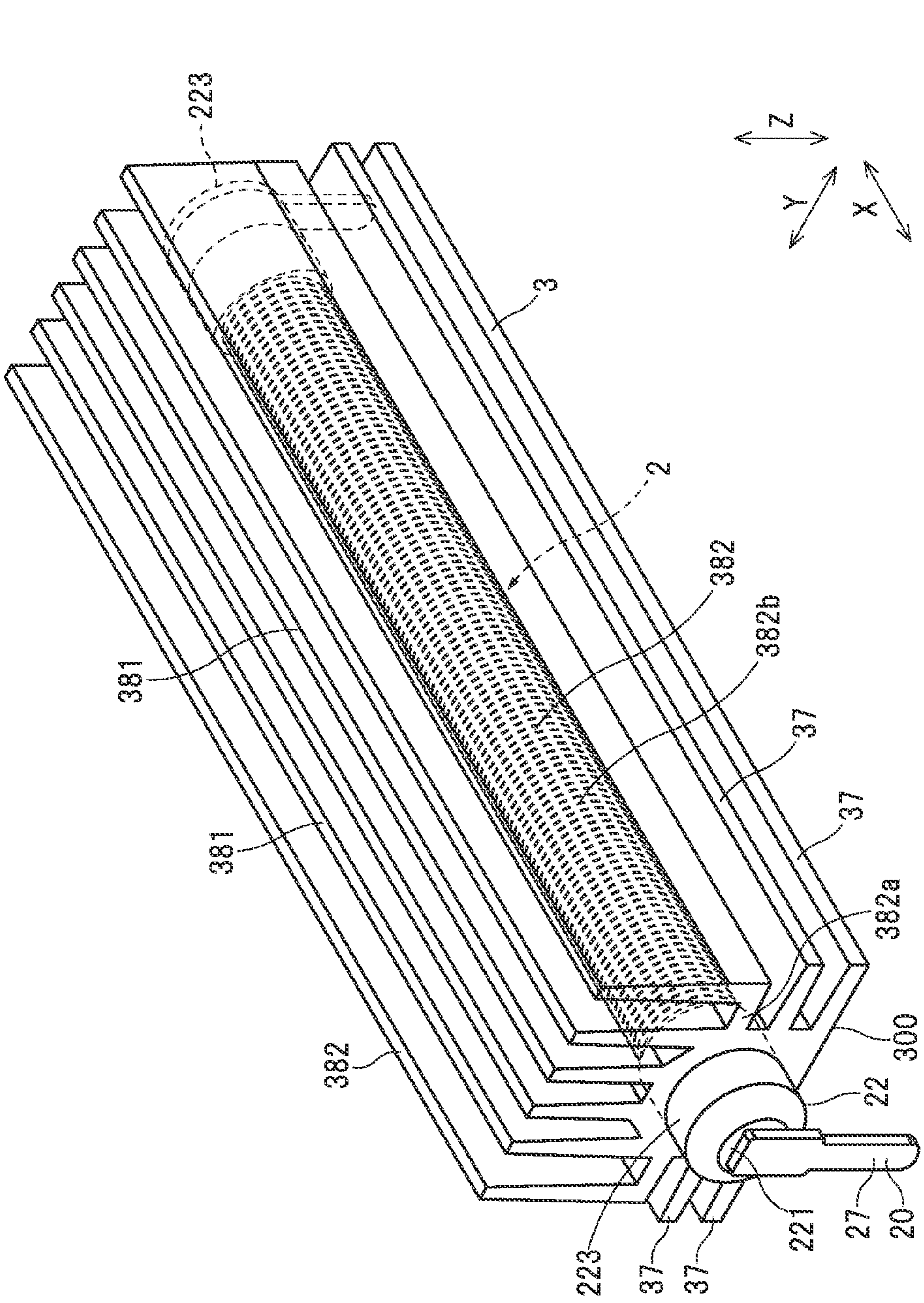
FIG. 14 is a perspective view showing a resistor according to the fourth embodiment.
Figure 15:
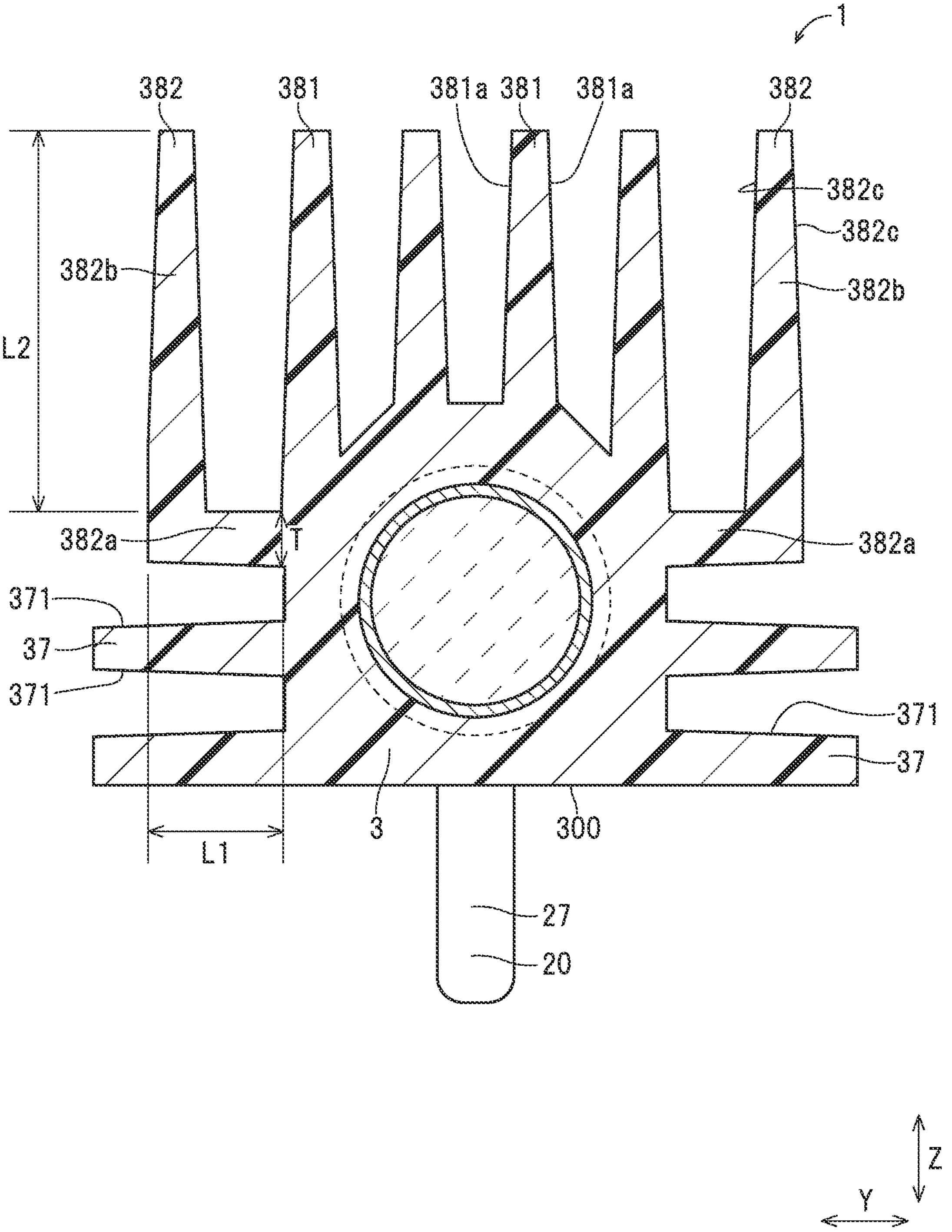
FIG. 15 is a cross-sectional view showing the resistor according to the fourth embodiment in a direction orthogonal to the longitudinal direction of the resistor.

FIG. 14 is a perspective view showing the resistor 1 according to the present embodiment. FIG. 15 is a cross-sectional view showing the resistor 1 according to the present embodiment in a direction orthogonal to the longitudinal direction X of the resistor 1.

As shown in FIG. 14, in the present embodiment, respective longitudinal outer ends of the pair of cap electrodes 22 form cap exposed portions 223 exposed from the resin portion 3. The cap exposed portion 223 is composed of a bottom portion 221, and a longitudinal outer portion of the side portion 222.

The resistor main body 2 comprises a pair of terminal pieces 27 respectively connected to the bottom portions 221 of the pair of cap electrodes 22. Each terminal piece 27 is protruded from the cap electrode 22 toward one direction orthogonal to the longitudinal direction X. The terminal piece 27 as a whole constitutes the exposed terminal 20 exposed from the resin portion 3. In the present embodiment, as with the first embodiment, the direction where the tip end of the exposed terminal 20 faces will be referred to as the vertical direction Z. The side to which the main surface 300 faces will be referred to as the lower side and the opposite side of that will be referred to as the upper side. In addition, the direction orthogonal to both the longitudinal direction X and the vertical direction Z will be referred to as a lateral direction Y.

The resin portion 3 comprises the resin main body 31 embedding the resistor main body 2, and a lateral fin 37 and vertical fins 381, 382 protruded from the resin main body 31. The lateral fin 37 is a radiation fin protruded from the resin main body 31 toward both sides in the lateral direction Y. The vertical fins 381, 382 are radiation fins protruded from the resin main body 31 toward both sides in the vertical direction Z. In the present embodiment, the resin portion 3 comprises two lateral fins 37 at both respective sides in the lateral direction Y. In addition, the resin portion 3 comprises six vertical fins 381, 382 protruded upward.

Four lateral fins 37 are formed at the bottom end of the resin portion 3. The four lateral fins 37 have the same protrusion length. As shown in FIG. 15, each of two upper side lateral fins 37 of the four lateral fins 37 is formed with both side surfaces 371 being inclined in such a manner that the thickness decreases as advancing toward a protruding end. In addition, each of two lower side lateral fins 37 of the four lateral fins 37 is configured in such a manner that both side surfaces 371 are inclined downward as advancing toward the protruding end. These inclinations are provided for improving the removal of the sliding core 7 as described below in manufacturing the resistor 1 to be described below. Bottom surfaces of two lower side lateral fins 37 of the four lateral fins 37 are planes orthogonal to the vertical direction Z and constitute the main surface 300 of the resin portion 3.

Upper end positions of six vertical fins 381, 382 are at the same height in the vertical direction Z. The six vertical fins 381, 382 comprise four first vertical fins 381 formed straight upward from the resin main body 31, and two second vertical fins 382 each comprising a base end portion 382*a* along the lateral direction Y and a tip end portion 382*b* protruding upward from the base end portion 382*a*. The two second vertical fins 382 are formed at both sides of the four first vertical fins 381 in the lateral direction Y. Further, the second vertical fin 382 is formed at a location overlapping with the lateral fin 37 in the vertical direction Z. In other words, a formation area of the second vertical fin 382 overlaps a formation area of the lateral fin 37. In the present embodiment, a length of the base end portion 382*a* of the second vertical fin 382 in the lateral direction Y is shorter than a length of the lateral fin 37 in the lateral direction Y. In addition, the six vertical fins 381, 382 are formed to fall within a range from the protruding end of the lateral fin 37 on one side to the protruding end of the lateral fin 37 on the other side.

As shown in FIG. 15, the four first vertical fins 381 are formed with both side surfaces 381*a* being inclined in such a manner that the thickness is reduced as advancing upward. In addition, each of the tip end portions 382*b* of two second vertical fins 382 is formed with both side surfaces 382*c* being inclined in such a manner that the thickness is reduced as advancing upward. These inclinations are provided for improving the removal of the movable die 6 as described below in manufacturing the resistor 1 to be described below.

In the cross-section of the resistor 1 in a direction orthogonal to the longitudinal direction X, a length of each radiation fin (i.e., the lateral fins 37 and the vertical fins 381, 382) is not less than two times, preferably not less than two and half times the maximum thickness T. Further, when the radiation fin has a curved shape like the second vertical fin 382, the length of the second vertical fin 382 means a total length of a length L1 of the base end portion 382*a* and a length L2 of the tip end portion 382*b*.

Figure 16:
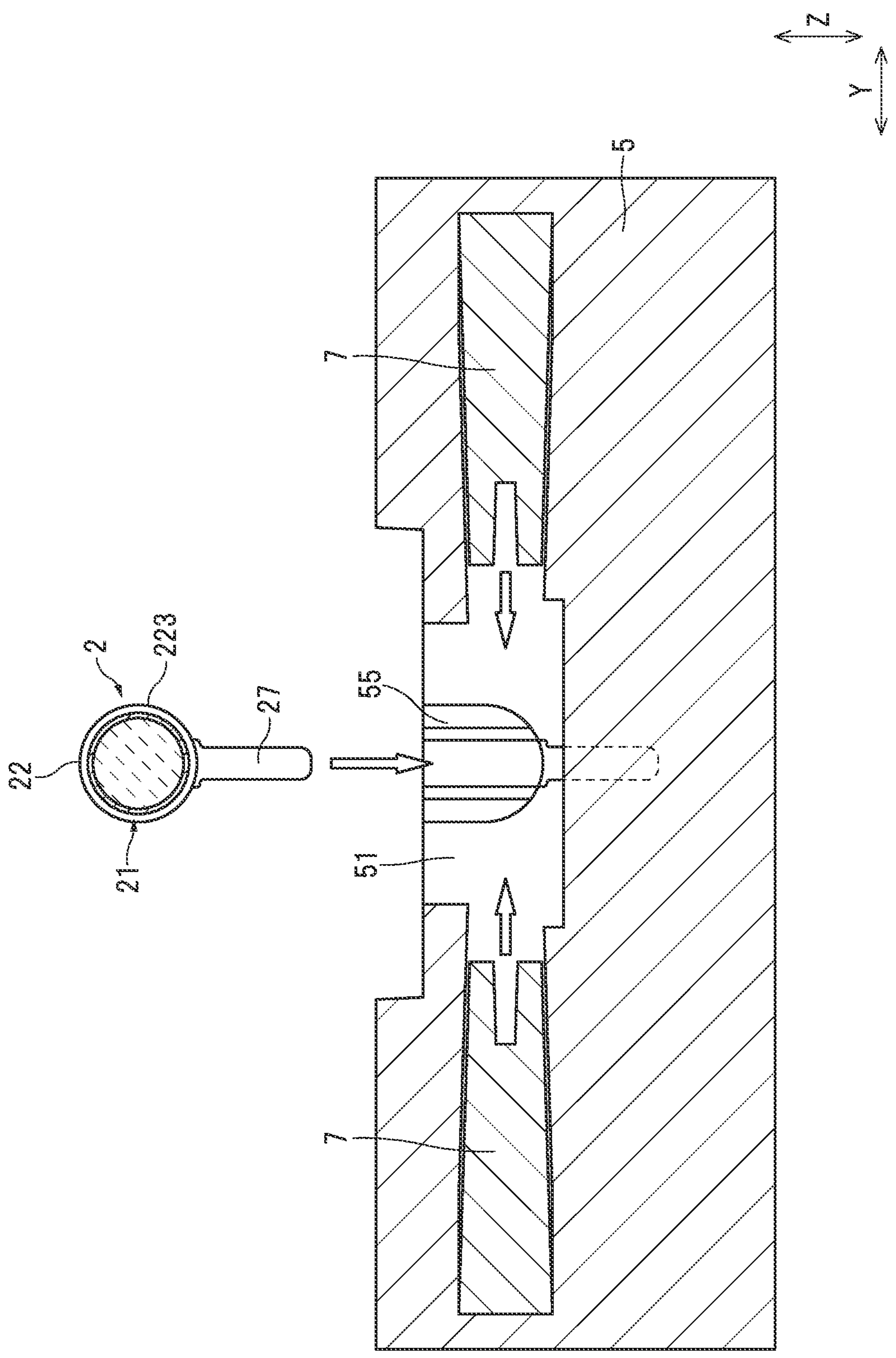
FIG. 16 is a cross-sectional view showing assembling the resistor main body to the stationary die in the fourth embodiment.

Next, the method for manufacturing the resistor 1 according to the present embodiment will be explained. FIG. 16 is a cross-sectional view showing the state where the resistor main body 2 is assembled to the stationary die 5. As shown in FIG. 16, firstly, the resistor main body 2 is arranged in the stationary die 5. The stationary die 5 is formed with the stationary side cavity surface 51 opening toward one side. The resistor main body 2 is moved toward the stationary die 5 along the vertical direction Z and arranged at a predetermined location of the stationary die 5. As described above, it is possible to assemble the resistor main body 2 to the stationary die 5 easily by providing the structure of arranging the resistor main body 2 in the stationary die 5 in the direction orthogonal to the longitudinal direction X, as compared with the structure of arranging the resistor main body 2 in stationary die 5 in the longitudinal direction X. When the resistor main body 2 is arranged in the stationary die 5, a holding cavity 55 of the stationary die 5 holds the cap exposed portion 223 and the terminal piece 27.

The sliding core 7 movable in the lateral direction Y is arranged in the stationary die 5. The sliding core 7 is provided for forming the lateral fin 37 of the resin portion 3 together with the stationary die 5. A pair of sliding cores 7 are fixed to the stationary die 5 at a predetermined location in the lateral direction Y in accordance with the length of the lateral fin 37. Then, the movable die 6 is moved toward the stationary die 5 in the vertical direction Z and the mold closing is completed.

Figure 17:
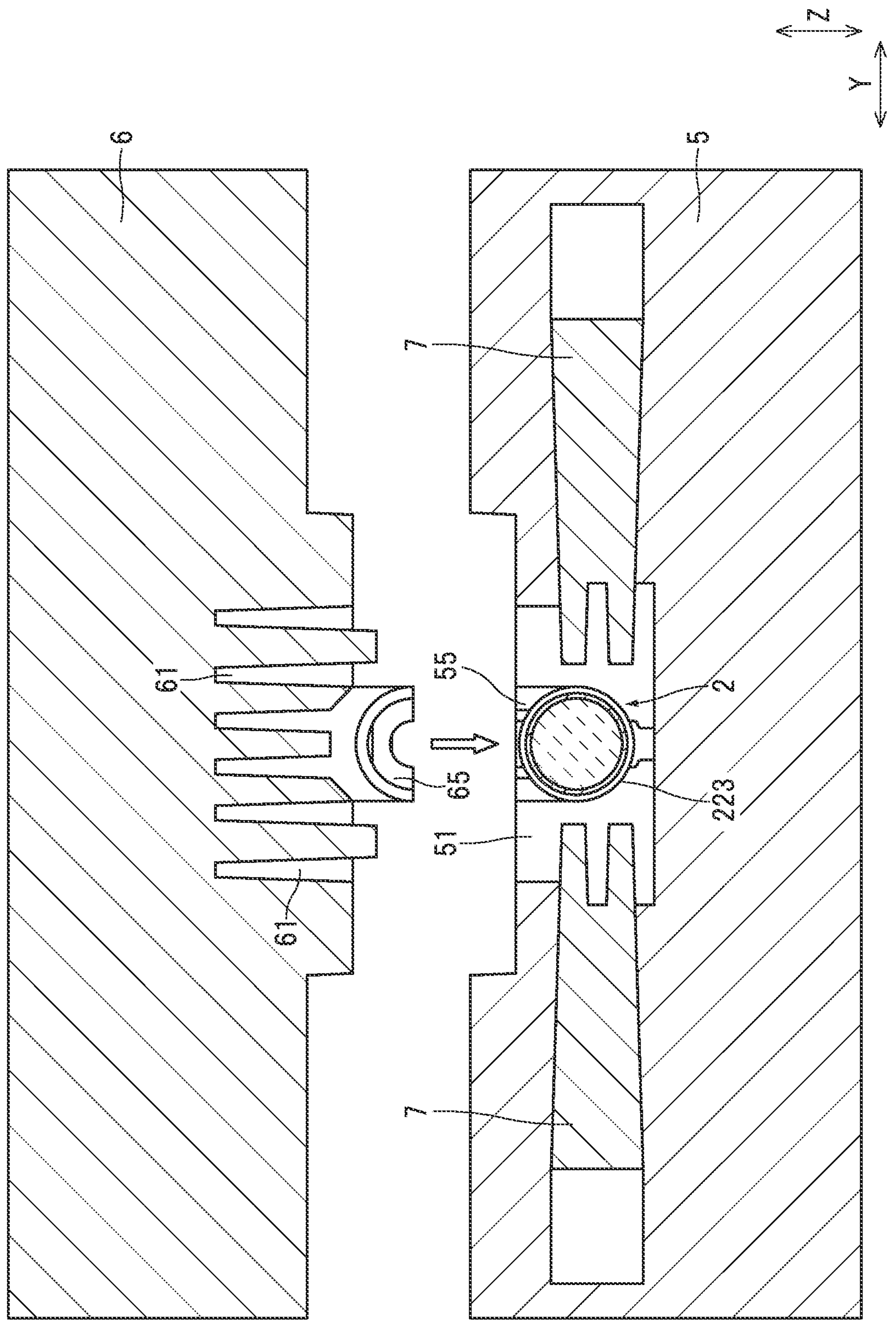
FIG. 17 is a cross-sectional view showing an approach of the movable die to the stationary die accommodating the resistor main body in the fourth embodiment.
Figure 18:
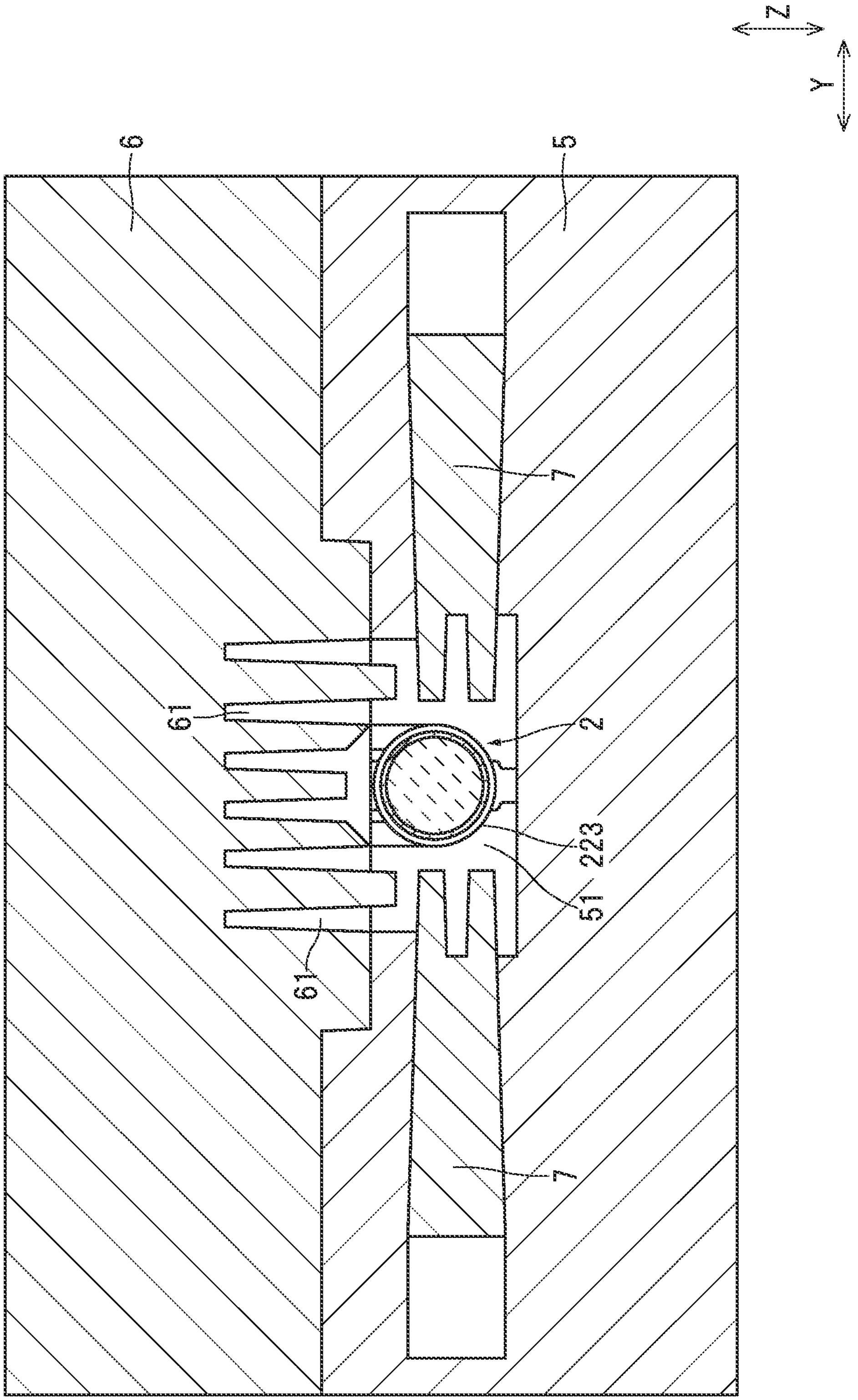
FIG. 18 is a cross-sectional view showing the stationary die, the movable die, and the resistor main body, after mold closing in the fourth embodiment.

FIG. 17 is a cross-sectional view showing an approach of the movable die 6 to the stationary die 5 accommodating the resistor main body 2. FIG. 18 is a cross-sectional view showing the stationary die 5, the movable die 6, and the resistor main body 2, which are tightened. The movable die 6 is formed with a movable side cavity surface 61 opening toward the stationary side cavity surface 51. The movable side cavity surface 61 is provided for forming six vertical fins 381, 382. In addition, second vertical fins 382 of the six vertical fins 381, 382 are formed in a space defined by the stationary side cavity surface 51, the movable side cavity surface 61, and the sliding core 7. In addition, the movable die 6 is formed with a holding portion 65 protruded toward the stationary die 5 side to hold the cap exposed portion 223 of the resistor main body 2 together with the holding cavity 55.

The resin portion 3 is formed by insert molding by injecting a molten resin in a region surrounded by the stationary side cavity surface 51, the movable side cavity surface 61, and the pair of sliding cores 7 that are tightened, and curing the resin. After the resin portion 3 is molded, the pair of sliding cores 7 are moved in the lateral direction Y to separate from each other, and the movable die 6 is separated from the stationary die 5 in the vertical direction Z so that the resistor 1 can be taken away from the stationary die 5.

Functions and Effects of the Fourth Embodiment

In the present embodiment, the resin portion 3 comprises only the lateral fin 37 and the vertical fins 381, 382 as the radiation fins. Thus, it is possible to simplify a structure of a mold for molding the resin portion 3.

In addition, the resin portion 3 comprises the plurality of lateral fins 37 protruded toward both sides in the lateral direction Y and the plurality of vertical fins 381, 382 protruded only upward in the vertical direction Z. Further, the plurality of vertical fins 381, 382 comprise the first vertical fin 381 formed straight in the vertical direction Z, and the second vertical fins 382 each comprising the base end portion 382*a* along the lateral direction Y and the tip end portion 382*b* protruding upward from the base end portion 382*a*. Furthermore, the second vertical fin 382 is formed at a location overlapped with the lateral fin 37 in the vertical direction Z. Hereby, it is possible to suppress the increase in size of the resistor 1 and the increase in surface area of the resin portion 3 since the second vertical fin 382 is formed in a space between the first vertical fin 381 and the lateral fin 37, i.e., a dead space. Besides, the similar effects to the first embodiment are achieved.

Fifth Embodiment

Figure 19:
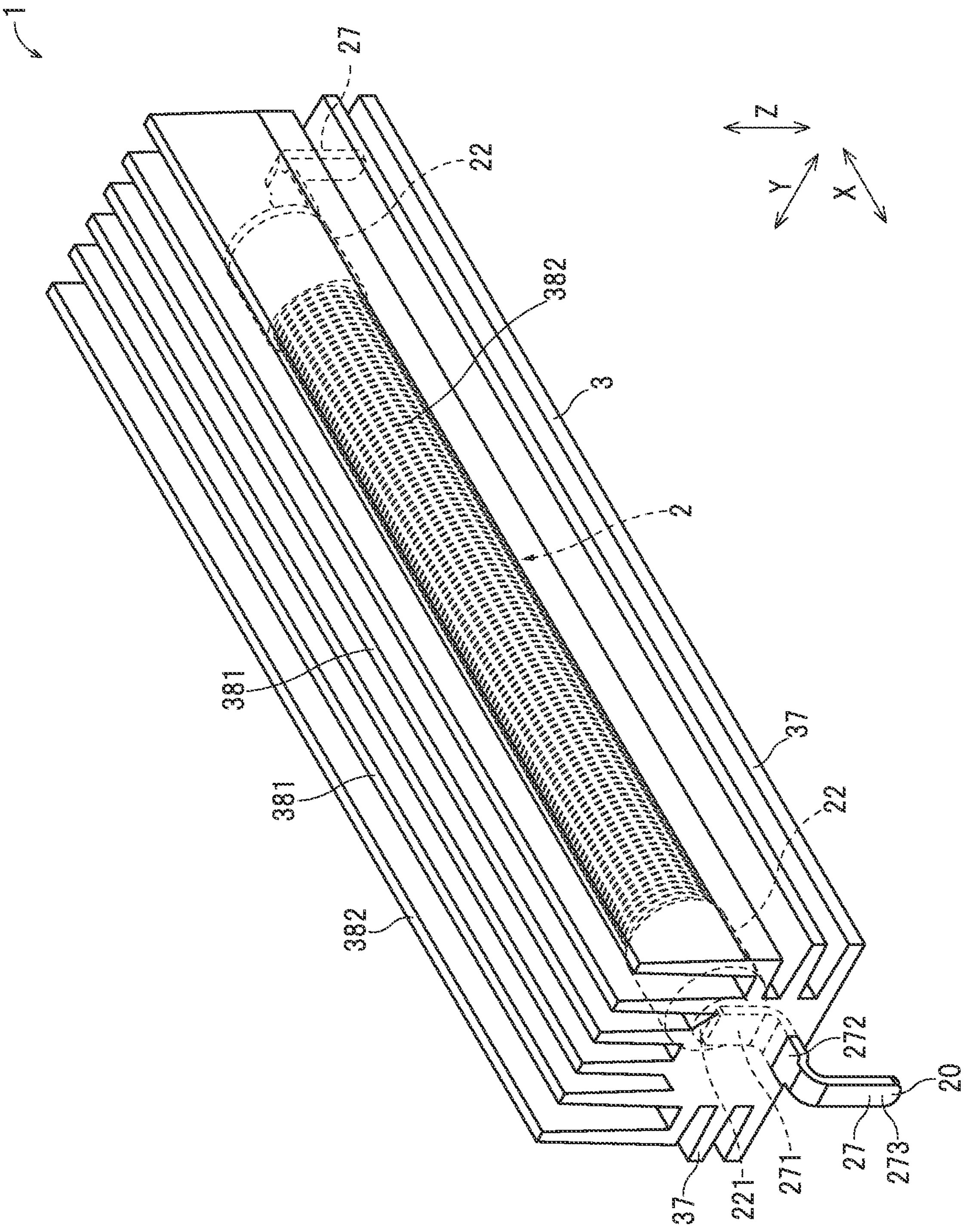
FIG. 19 is a perspective view showing a resistor according to the fifth embodiment.

FIG. 19 is a perspective view showing the resistor 1 according to the present embodiment.

The present embodiment has a main structure similar to the fourth embodiment except for a shape of the terminal piece 27 and a formation range of the resin portion 3.

The terminal piece 27 comprises a first portion 271 being joined to overlap with the bottom portion 221 of the cap electrode 22, a second portion 272 extended longitudinally outward from an end of the first portion 271 opposite to a protruding side of the vertical fins 381, 382, and a third portion 273 extended from a longitudinal outer end of the second portion 272 toward the protruding side of the vertical fins 381, 382. The terminal piece 27 constitutes a longitudinal outer portion of the second portion 272 and the exposed terminal 20 in which the third portion 273 is exposed from the resin portion 3. The resin portion 3 is formed longitudinally outward with respect to the pair of cap electrodes 22. The other structure of the resistor 1 is similar to the fourth embodiment.

In addition, the method for manufacturing the resistor 1 according to the present embodiment can be the same as the method according to the fourth embodiment. Note that, when the stationary die 5 holds the resistor main body 2, the stationary die 5 holds only the exposed terminal 20 in the present embodiment.

Functions and Effects of the Fifth Embodiment

In the present embodiment, it is possible to have the same effects with the fifth embodiment and it is possible to achieve further improvement in the heat dissipation property of the resistor 1 since the formation range of the resin portion 3 is large.

Summary of the Embodiments

Next, the technical concept grasped from the above-described embodiment is described with reference to the signs or the like in the embodiment. However, each sign or the like in the following description is not limited to a member or the like specifically showing the elements in the following claims in the embodiment.

According to the first feature, a resistor 1 includes a resistor main body 2; and a resin portion 3 covering the resistor main body 2, wherein the resin portion 3 comprises a radiation fin 32, 33, 34, 35, 36, 37, 381, 382.

According to the second feature, in the resistor 1 according to the first feature, the radiation fin 32, 33, 34, 35, 36, 37, 381, 382 is formed lengthy in a longitudinal direction X of the resistor main body 2.

According to the third feature, in the resistor 1 according to the first or second feature, a length L of the radiation fin 32, 33, 34, 35, 36, 37, 381, 382 is not less than two times a maximum thickness T of the radiation fin 32, 33, 34, 35, 36, 37, 381, 382 in a cross-section orthogonal to a longitudinal direction X of the resistor main body 2.

According to the fourth feature, in the resistor 1 according to any one of the first to third features, the resin portion 3 includes only a lateral fin 37 protruded in a lateral direction Y orthogonal to the longitudinal direction X of the resistor main body 2, and a vertical fin 381, 382 protruded in a vertical direction Z orthogonal to both the longitudinal direction X and the lateral direction Y as the radiation fin 37, 381, 382.

According to the fifth feature, in the resistor 1 according to the fourth feature, the resin portion 3 includes a plurality of the lateral fins 37 protruded toward both sides in the lateral direction Y, and a plurality of the vertical fins 381, 382 protruded toward only one side in the vertical direction Z, wherein the plurality of vertical fins 381, 382 includes a first vertical fin 381 formed straight in the vertical direction Z, a second vertical fin 382 comprising a base end portion 382*a* along the lateral direction Y, and a tip end portion 382*b* protruded from the base end portion 382*a* toward the one side in the vertical direction Z, and wherein the second lateral fin 382 is formed at a location overlapping with the lateral fin 37 in the vertical direction Z.

According to the sixth feature, in the resistor 1 according to any one of the first to third feature, in the resin portion 3 comprises a plurality of the radiation fins 33, 35 that are radially protruded when viewed from a longitudinal direction X of the resistor main body 2.

According to the seventh feature, in the resistor 1 according to any one of the first to sixth features, the resistor main body 2 includes an exposed terminal 20 exposed from the resin portion 3, and wherein the resin portion 3 comprises the radiation fin 32, 33, 35, 381, 382 protruded toward a side opposite to a tip end side of the exposed terminal 20.

According to the eighths feature, in the resistor 1 according to any one of the first to the seventh features, the resin portion 3 comprises a base resin 301 and a filler 302 having a thermal conductivity higher than the base resin 301.

According to the ninth feature, in the resistor 1 according to the eighth feature, a thermal conductivity of the resin portion 3 is 3 W/m·K or more and 10 W/m·K or less.

NOTES

Although the embodiments of the invention have been described, the invention is not to be limited to the embodiments. Please note that all combinations of the features described in the embodiments are not necessary to solve the problem of the invention. In addition, the various kinds of modifications can be implemented without departing from the gist of the invention.

The invention claimed is:

1. A resistor, comprising:

a resistor main body; and a resin portion covering the resistor main body, wherein the resin portion comprises a plurality of radiation fins, wherein the plurality of radiation fins comprises a plurality of lateral radiation fins protruded in a lateral direction orthogonal to a longitudinal direction of the resistor main body, and a plurality of vertical radiation fins protruded in a vertical direction orthogonal to both the longitudinal direction of the resistor man body and the lateral direction, and wherein the plurality of the lateral radiation fins protrude from opposite sides of the resistor man body in the lateral direction, and a plurality of the vertical radiation fins protrude from only one side of the resistor man body in the vertical direction, wherein the plurality of vertical radiation fins comprise a first vertical radiation fin formed straight in the vertical direction, and a second vertical radiation fin comprising a base end portion along the lateral direction, and a tip end portion protruded from the base end portion from the one side in the vertical direction, and wherein the second vertical radiation fin is formed at a location overlapping with the plurality lateral radiation fins in the vertical direction.

2. The resistor according to claim 1, wherein the plurality of radiation fins are formed lengthy in a longitudinal direction of the resistor main body.

3. The resistor according to claim 1, wherein a length of the plurality of radiation fins is not less than two times a maximum thickness of the plurality of radiation fin in a cross-section orthogonal to a longitudinal direction of the resistor main body.

4. The resistor according to claim 1, wherein the resistor main body comprises an exposed terminal exposed from the resin portion, and wherein the plurality of vertical radiation fins protrude from a side opposite to a tip end side of the exposed terminal.

5. The resistor according to claim 1, wherein the resin portion comprises a base resin and a filler having a thermal conductivity higher than the base resin.

6. The resistor according to claim 5, wherein a thermal conductivity of the resin portion is 3 W/(m·K) or more and 10 W/(m·K) or less.

* * * * *